United States Patent
Saino

(10) Patent No.: US 10,497,359 B2
(45) Date of Patent: Dec. 3, 2019

(54) DISPLAY CONTROL METHOD AND EDITING APPARATUS FOR VOICE SYNTHESIS

(71) Applicant: YAMAHA CORPORATION, Hamamatsu-shi (JP)

(72) Inventor: Keijiro Saino, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 13 days.

(21) Appl. No.: 15/891,404

(22) Filed: Feb. 8, 2018

(65) Prior Publication Data

US 2018/0166064 A1 Jun. 14, 2018

Related U.S. Application Data

(63) Continuation of application No. PCT/JP2016/070817, filed on Jul. 14, 2016.

(30) Foreign Application Priority Data

Aug. 21, 2015 (JP) ................................ 2015-164279

(51) Int. Cl.
*G10L 13/033* (2013.01)
*G10L 13/00* (2006.01)
(Continued)

(52) U.S. Cl.
CPC .......... *G10L 13/0335* (2013.01); *G06F 3/048* (2013.01); *G10H 1/0008* (2013.01);
(Continued)

(58) Field of Classification Search
CPC ..... G10L 13/0335; G10L 13/00; G10L 13/02; G10L 13/043; G06F 3/048;
(Continued)

(56) References Cited

U.S. PATENT DOCUMENTS 6,091,415 A * 7/2000 Chang ................... G06F 3/0481
715/809
6,271,841 B1 * 8/2001 Tsujimoto ............. G06T 11/001
715/839
(Continued)

FOREIGN PATENT DOCUMENTS

JP H10333799 A 12/1998
JP 2004264676 A * 9/2004 ............... G10H 5/00
(Continued)

OTHER PUBLICATIONS

International Search Report issued in International Appln. No. PCT/JP2016/070817 dated Sep. 27, 2016. English translation provided.

(Continued)

*Primary Examiner* — David S Warren
*Assistant Examiner* — Christina M Schreiber
(74) *Attorney, Agent, or Firm* — Rossi, Kimms & McDowell LLP

(57) ABSTRACT

A display control method executed by a processor, the method includes the steps of: displaying, on a display device, a note icon that represents a note of a voice to be synthesized and an indicator that is moved in accordance with an operation received from a user; displaying, on the display device, first options that belong to a first layer among layers in a hierarchical structure, for the user to select a singing expression to be applied to the note from among a plurality of singing expressions; and displaying, on the display device, when the indicator is moved into an area corresponding to a particular option selected from among the first options, second options that correspond to the particular option and belong to a second layer that is below the first layer in the hierarchical structure.

16 Claims, 12 Drawing Sheets

(51) Int. Cl.
*G10L 13/02* (2013.01)
*G10L 13/04* (2013.01)
*G06F 3/048* (2013.01)
*G06F 3/0484* (2013.01)
*G10H 1/00* (2006.01)

(52) U.S. Cl.
CPC ......... *G10H 1/0091* (2013.01); *G10L 13/043* (2013.01); *G06F 3/04847* (2013.01); *G10H 2220/116* (2013.01); *G10H 2220/126* (2013.01); *G10H 2250/025* (2013.01); *G10H 2250/455* (2013.01); *G10L 13/00* (2013.01); *G10L 13/02* (2013.01)

(58) Field of Classification Search
CPC .............. G06F 3/04847; G10H 1/0008; G10H 1/0091; G10H 2220/116; G10H 2220/126; G10H 2250/025; G10H 2250/455
USPC .......................................................... 84/645
See application file for complete search history.

(56) References Cited

U.S. PATENT DOCUMENTS

| | | | | |
|---|---|---|---|---|
| 6,281,420 B1* | 8/2001 | Suzuki | ................. | G10H 1/0008 84/477 R |
| 6,798,427 B1* | 9/2004 | Suzuki | ................. | G10H 1/0008 84/604 |
| 2004/0186720 A1* | 9/2004 | Kemmochi | .............. | G10H 5/00 704/258 |
| 2006/0075348 A1* | 4/2006 | Xu | ........................ | G06F 3/0481 715/730 |
| 2009/0114079 A1* | 5/2009 | Egan | .................... | G09B 15/023 84/477 R |
| 2016/0260425 A1* | 9/2016 | Saino | .................... | G10L 13/047 |
| 2018/0166064 A1* | 6/2018 | Saino | ..................... | G10L 13/00 |
| 2019/0251950 A1* | 8/2019 | Bonada | .................. | G10L 13/00 |

FOREIGN PATENT DOCUMENTS

| | | | |
|---|---|---|---|
| JP | 2004264676 A | | 9/2004 |
| JP | 2009258292 A | | 11/2009 |
| JP | 2013137520 A | | 7/2013 |
| JP | 2018077283 A | * | 5/2018 |

OTHER PUBLICATIONS

Written Opinion issued in International Appln. No. PCT/JP2016/070817 dated Sep. 27, 2016.

"Piapro Studio", V4X, Crypton Future Media, Inc., Jun. 30, 2016: 1-4. English translation provided. Cited in the specification.

Office Action issued in Japanese Application No. 2015-164279 dated Aug. 13, 2019. English translation provided.

* cited by examiner

SPEED VARIABLE $S_A = 0$ (INITIAL STATE)

SPEED VARIABLE $S_A > 0$

CONTRACTION ← - - - - - - - - - - → EXTENSION

SPEED VARIABLE $S_A < 0$

EXTENSION ← - - - - - - - - - - → CONTRACTION

DISPLAY CONTROL METHOD AND EDITING APPARATUS FOR VOICE SYNTHESIS

BACKGROUND OF THE INVENTION

Field of the Invention

The present invention relates to a technique that allows a user to edit a content of voice synthesis.

Description of the Related Art

There have been proposed in the art different techniques for synthesizing a voice to which a variety of types of singing expressions can be applied. For example, in an article introducing new features of "Piapro Studio" V4X, Crypton Future Media, INC., <URL: http://www.crypton-.co.jp/mp/pages/prod/vocaloid/v4x.jsp>(website visited on May 20, 2015) (hereinafter referred to as Non-Patent Document 1), a configuration is disclosed in which there are listed a variety of types of singing expressions from which a user may select a desired type.

The technique disclosed in Non-Patent Document 1 causes all possible different types of singing expressions available for selection by a user, to be displayed in parallel form in a list. Due to the large number of types of singing expressions that are made available, the user may find it difficult to find and select a desired type of singing expression.

SUMMARY OF THE INVENTION

In view of the above, it is an object of the present invention to reduce the difficulty placed on a user when selecting a singing expression.

A display control method according to the present invention is executed by a processor and includes the steps of: displaying, on a display device, a note icon that represents a note of a voice to be synthesized and an indicator that is moved in accordance with an operation received from a user; displaying, on the display device, first options that belong to a first layer among layers in a hierarchical structure, for the user to select a singing expression to be applied to the note from among a plurality of singing expressions; and displaying, on the display device, when the indicator is moved into an area corresponding to a particular option selected from among the first options, second options that correspond to the particular option and belong to a second layer that is below the first layer in the hierarchical structure.

DESCRIPTION OF THE EMBODIMENTS

First Embodiment

Figure 1:
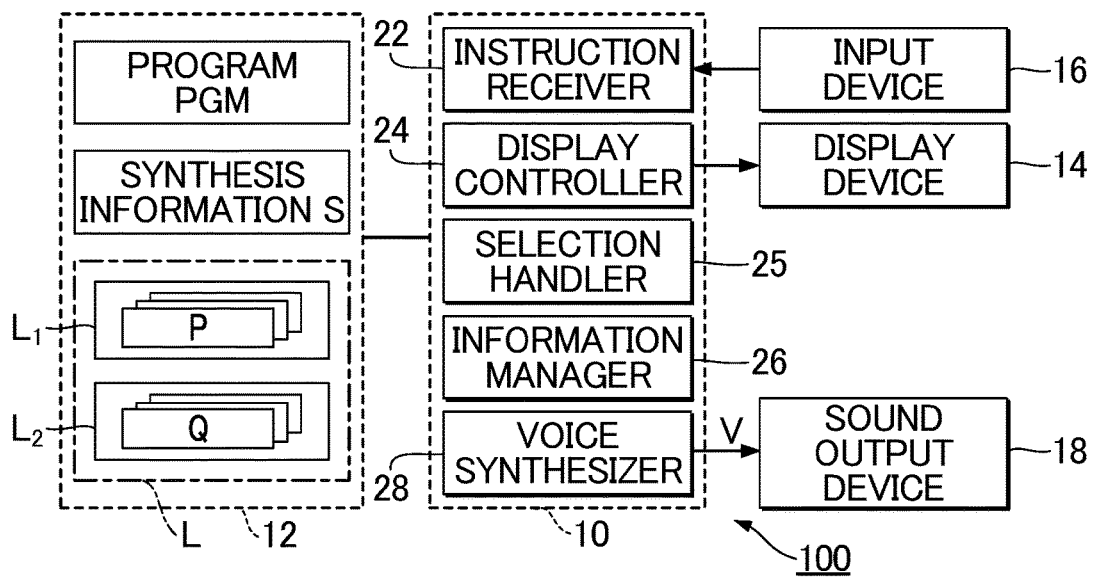
FIG. 1 is a block diagram illustrating a voice synthesis apparatus according to a first embodiment of the present invention.

FIG. 1 is a block diagram illustrating a voice synthesis apparatus 100 in a first embodiment of the present invention. The voice synthesis apparatus 100 in the first embodiment is a signal processing apparatus that generates a voice signal V representative of a voice singing a given piece of music, by using unit concatenation voice synthesis which connects sound units. As shown in FIG. 1, the voice synthesis apparatus 100 is realized by a computer system (an information processing device, such as a mobile phone or a personal computer) that includes an arithmetic processing device 10, a storage device 12, a display device 14, an input device 16, and a sound output device 18.

The display device 14 (e.g., a liquid crystal display panel) displays an image instructed by the arithmetic processing device 10. The input device 16 is an operating device that is operated by a user for the purpose of providing the voice synthesis apparatus 100 with different instructions. In other words, the input device 16 receives an operation from a user. A pointing device, such as a mouse, is assumed as the input device 16 in the first embodiment. The sound output device 18 (e.g., a loudspeaker or headphones) reproduces sounds corresponding to voice signals V.

The storage device 12 is, for example, a non-transitory recording medium. Any known storage medium, such as a semiconductor recording medium or a magnetic recording medium, or a combination of recording media may be used as the storage device 12. In this specification, a non-transitory recording medium encompasses all computer-readable storage media excluding a transitory, propagating signal, and does not exclude volatile storage media. The storage device 12 stores a program PGM that is executed by the arithmetic processing device 10 together with a variety of data used by the arithmetic processing device 10. The storage device 12 in the first embodiment stores sound unit groups L and synthesis information S as described below.

A sound unit group L is a collection of sound units (a voice synthesis library) obtained in advance from a recorded voice of a particular singer. Each sound unit is a phoneme corresponding to the smallest linguistic unit of a voice or a phoneme chain (e.g., a diphone or a triphone) consisting of inter-connected phonemes. A sound unit is expressed as a sound waveform in a time domain or a spectrum in a frequency domain. The sound unit groups L in the first embodiment contain a sound unit group $L_1$ and a sound unit group $L_2$. The sound unit group $L_1$ contains sound units P obtained from general voice utterances of the singer. The sound unit group $L_2$ contains sound units Q obtained from the voice uttered by the same singer as that for the sound units P. The sound units Q, however, differ from the sound units P in vocal characteristics. Each sound unit Q is obtained from the voice of the singer uttered at a certain pitch in a certain singing expression. More specifically, a sound unit Q is obtained from the voice of the singer uttered with special (non-modal) vocal characteristics in a particular singing expression, which is produced by movement of at least either the vocal chords or the mouth cavity in a way that differs to that in producing a general voice utterance. The sound unit group $L_2$ contains sound units Q to which singing expressions of a rough voice, a husky voice, a growling voice, or other characteristic singing expressions have been applied. Alternatively, the singer whose voice is used for sound units Q of the sound unit group $L_2$ may be different from a singer whose voice is used for sound units P of the sound unit group $L_1$.

Figure 2:
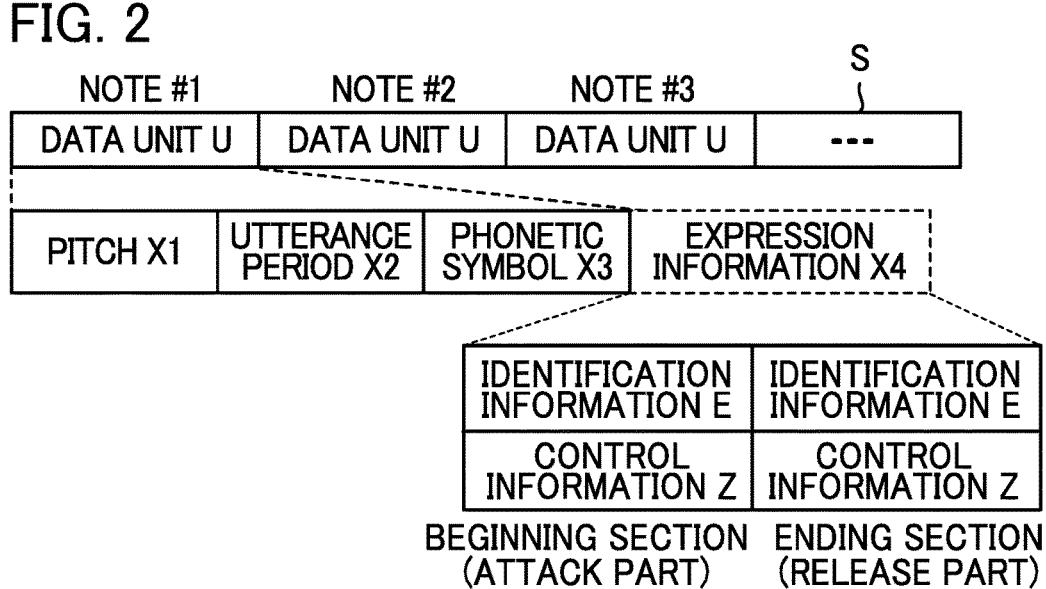
FIG. 2 is a schematic diagram of synthesis information.

As shown in FIG. 2, the synthesis information S consists of time series data that specifies the singing voice of any given piece of music (hereinafter, a "synthesized song"), and contains a data unit U for each of notes that constitute the synthesized song. The data unit U of any given note specifies a pitch X1, an utterance period X2, and a phonetic symbol X3 of the note. The pitch X1 may be, for example, a note number according to the Musical Instrument Digital Interface (MIDI). The utterance period X2 is the time length (sound value) of a note, and is defined, for example, by a start time and a duration (or an end time) of an utterance. As will be understood from the above description, the synthesis information S may be expressed as time series data designating the score of the synthesized song. The phonetic symbol X3 specifies the content of the voice to be synthesized (i.e., here, the words or lyrics included in the synthesized song). More specifically, the phonetic symbol X3 specifies a unit of the voice (e.g., a syllable or a mora) uttered with respect to a note in the synthesized song.

The user may apply a desired singing expression to each note in a synthesized song. Expression information X4 that defines a singing expression is appended to the data unit U, within the synthesis information S, of a note to which the singing expression is applied. The expression information X4 includes identification information E representing a type of the singing expression and control information Z including variables related to the process of applying the singing expression to the voice to be synthesized. In the first embodiment, the user may specify a singing expression for each of a beginning section and an ending section of a given note, the beginning section being at the start side within the utterance period X2 of the note (e.g., an attack part) and the ending section being at the end side within the utterance period X2 of the note (e.g., a release part). That is, for each of the beginning section and the ending section of a note, identification information E and control information Z of a singing expression are set. In other words, the expression information X4 is set for each section, within a note, to which a singing expression is applied.

The arithmetic processing device 10 (e.g., a Central Processing Unit (CPU) or simply a processor) in FIG. 1 realizes functions for the purpose of editing the synthesis information S and generating voice signals V (the functions of an instruction receiver 22, a display controller 24, a selection handler 25, an information manager 26, and a voice synthesizer 28) by executing the program PGM stored in the storage device 12. Other possible configurations are one in which the functions of the arithmetic processing device 10 are distributed in multiple devices, or one in which a part of the functions of the arithmetic processing device 10 is realized by exclusive electric circuitry (e.g., a Digital Signal Processor (DSP)).

Figure 3:
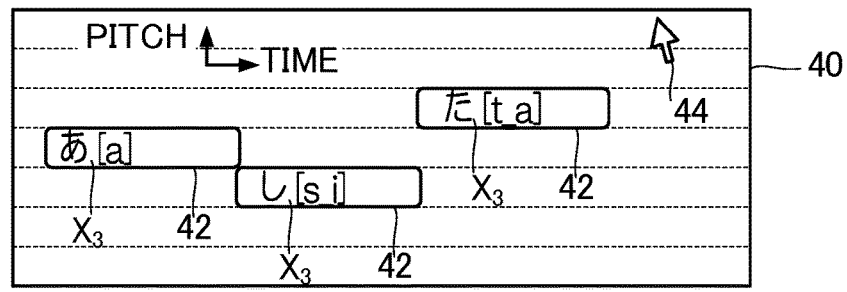
FIG. 3 is a diagram explaining an editing screen.

The instruction receiver (instruction receiving means) 22 receives instructions from the user, which instructions correspond to an operation made by the user; or more specifically, correspond to an operation made by the user at the input device 16. The display controller (display control means) 24 causes different images to be displayed on the display device 14. More specifically, the display controller 24 in the first embodiment causes an editing screen to be displayed on the display device 14, the editing screen allowing the user to review a content of the synthesized song specified by synthesis information S. An example of an editing screen 40 is shown in FIG. 3. The editing screen 40 is a piano-roll shaped coordinate plane (score region) having a time axis (horizontal axis) and a pitch axis (vertical axis) that cross each other. The display controller 24 displays on the editing screen 40 an indicator 44 that is moved according to the operation received by the instruction receiver 22. The indicator 44 is an icon (e.g., a pointer) that indicates a particular position on the editing screen 40 by moving in accordance with an operation input at the input device 16.

For each note that is specified by the synthesis information S, the display controller 24 positions a note icon 42 on the editing screen 40. The note icon 42 is an image used to represent each note in the synthesized song. More specifically, the position of a note icon 42 relative to the pitch-axis direction is set according to the pitch X1 specified by the synthesis information S with respect to a note corresponding to the note icon 42, and the position and display length of the note icon 42 relative to the time-axis direction is set according to the utterance period X2 specified by the synthesis information S with respect to the note. To the note icon 42 of each note, the phonetic symbol X3 (an utterance character/letter(s) and a phoneme sign) is applied.

The user may instruct the voice synthesis apparatus 100 (editing screen 40) of at least either an addition/shift of the note icon 42 or an addition/change of the phonetic symbol X3 by appropriately operating the input device 16 while referring to the editing screen 40 in FIG. 3. The display controller 24 updates the editing screen 40 (at least either the note icon 42 or the phonetic symbol X3) according to the instruction received from the user by the instruction receiver 22.

The information manager 26 in FIG. 1 edits the synthesis information S according to the instruction provided by the user at the editing screen 40. For example, in accordance with an instruction to shift a note icon 42 relative to the pitch-axis direction, the information manager 26 changes the pitch X1 corresponding to that note icon 42 within the synthesis information S. Similarly, in accordance with an instruction to change at least either the position or display length of a note icon 42 relative to the time-axis direction, the information manager 26 changes the utterance period X2 corresponding to that note icon 42 within the synthesis information S. Furthermore, when the phonetic symbol X3 of a given note is changed, the information manager 26 changes the phonetic symbol X3 corresponding to that note within the synthesis information S.

The selection handler (selection handling means) 25 in FIG. 1 allows the user to select, from among candidates, a singing expression to be applied to the voice of the note represented by a note icon 42. The singing expressions from which the user may select one are defined in a hierarchical structure formed of multiple layers.

Figure 4A:
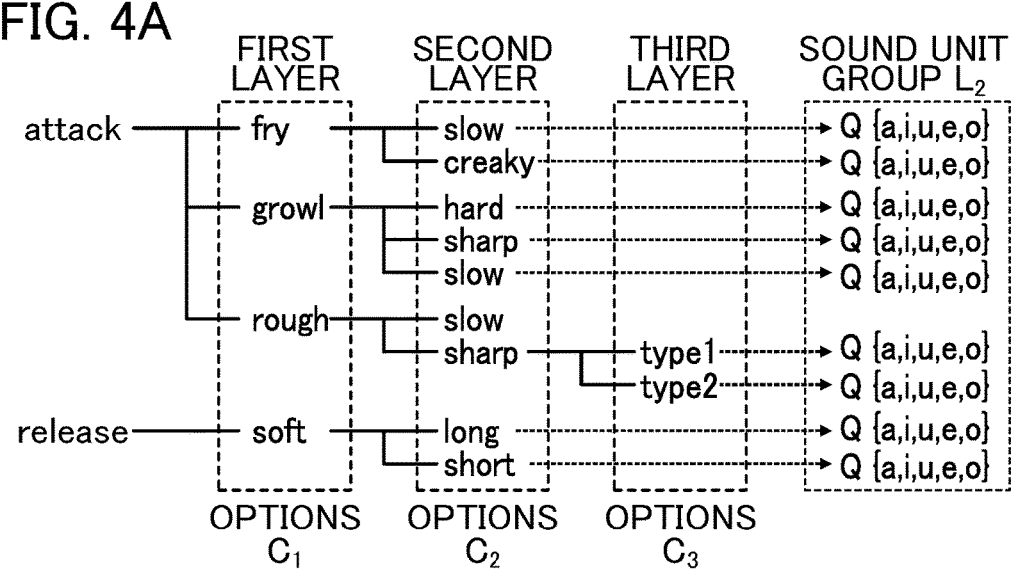
FIG. 4A is a diagram explaining a hierarchical structure of singing expressions.

FIG. 4A is a diagram explaining a hierarchical structure to select one of singing expressions. FIG. 4A shows an example hierarchical structure of singing expressions that each can be applied to the beginning section of a note (e.g., the attack) and an example hierarchical structure of singing expressions that each can be applied to the ending section (e.g., the release). As shown in FIG. 4A, multiple layers that constitute a hierarchical structure each include options C ($C_1$, $C_2$, and $C_3$). A given option C belonging to the second layer or lower corresponds to an option C belonging to a layer higher than that to which the given option C belongs.

For example, in the first layer (the highest layer) of the singing expressions that can be applied to the beginning section, three options $C_1$ are included: namely, "fry" (vocal fry), "growl", and "rough". Each option $C_1$ (first option) in the first layer represents a category of one or more singing expressions corresponding to the option $C_1$. Accordingly, by selecting one of the options $C_1$, the user selects one of the categories of singing expressions.

The second layer is a layer below the first layer in the hierarchical structure. That is, the second layer is the second highest layer among the layers in the hierarchical structure. The following options are included in the second layer: two options $C_2$, "slow" and "creaky", that correspond to "fry" in the first layer; three options $C_2$, "hard", "sharp", and "slow", that correspond to "growl" in the first layer; and two options $C_2$, "slow" and "sharp", that correspond to "rough" in the first layer. Each option $C_2$ (second option) in the second layer represents a feature of a singing expression(s) that corresponds to the option $C_1$ corresponding to each option $C_2$. For example, a singing expression with "slow" means that this singing expression is to make the beginning (or attack) of a sound relatively gradual, and a singing expression with "sharp" means that this singing expression is to make the beginning of a sound relatively rapid. A singing expression with "hard" means that this singing expression makes the strength of the main feature of this singing expression represented by the corresponding option $C_1$ (in this case, the category "growl") is notable. In the same way, options $C_2$ corresponding to a category (an option $C_1$) represent subsidiary features of singing expressions of the category. By selecting one of the options $C_2$ corresponding to the option $C_1$ selected in the first layer, the user selects one of the subsidiary features of the singing expressions corresponding to the selected option $C_1$.

Two supplemental options $C_3$ in the third layer, namely "type 1" and "type 2" are corresponded with "sharp" in the second layer, where the "sharp" in the second layer corresponds to "rough" in the first layer. The "type 1" and "type 2" have different vocal characteristics from one another. A combination of options C belonging to different layers from the first to the last layer specifies a single type of a singing expression. More specifically, in FIG. 4A, eight types of singing expressions are shown as examples: namely, "fry-slow", "fry-creaky", "growl-hard", "growl-sharp", "growl-slow", "rough-slow", "rough-sharp-type1" and "rough-sharp-type2". As will be understood from the above examples, multiple types of singing expressions (e.g., "fry-slow", "growl-slow" and "rough-slow") may have common option(s) C in each of the second and lower layers.

In the above description, examples are given of singing expressions that apply to the beginning section of a note. A similar hierarchical structure defines the singing expressions for the ending section of a note. More specifically, the first layer includes one option $C_1$ (first option), "soft", which means that a voice sound slowly decays, as in a sigh; and the second layer includes two options $C_2$ (second options), "long" (taking a long time) and "short" (taking a short time), each of which corresponds to the option $C_1$. In other words, FIG. 4A shows as examples two types of singing expressions: "soft-long" and "soft-short". As will be understood from the above description, FIG. 4A shows ten types of singing expressions including eight types of singing expressions for the beginning section of a note and two types of singing expressions for the ending section of the note.

A sound unit Q uttered using one type of a singing expression is included in the sound unit group $L_2$ for each of multiple vowels (a, i, u, e, and o). More specifically, from a voice steadily uttering a given vowel with a particular singing expression, a sound unit Q of the vowel corresponding to the singing expression is collected. The types of singing expressions are not limited to the examples shown in FIG. 4A. For example, singing expressions for the beginning section may include a singing technique of raising a voice from a pitch lower than a target pitch of a note to that target pitch (so-called "bend-up"). Similarly, singing expressions for the ending section may include "fry", which means that a voice is accompanied by irregular vibration of the vocal cords.

Figure 4B:
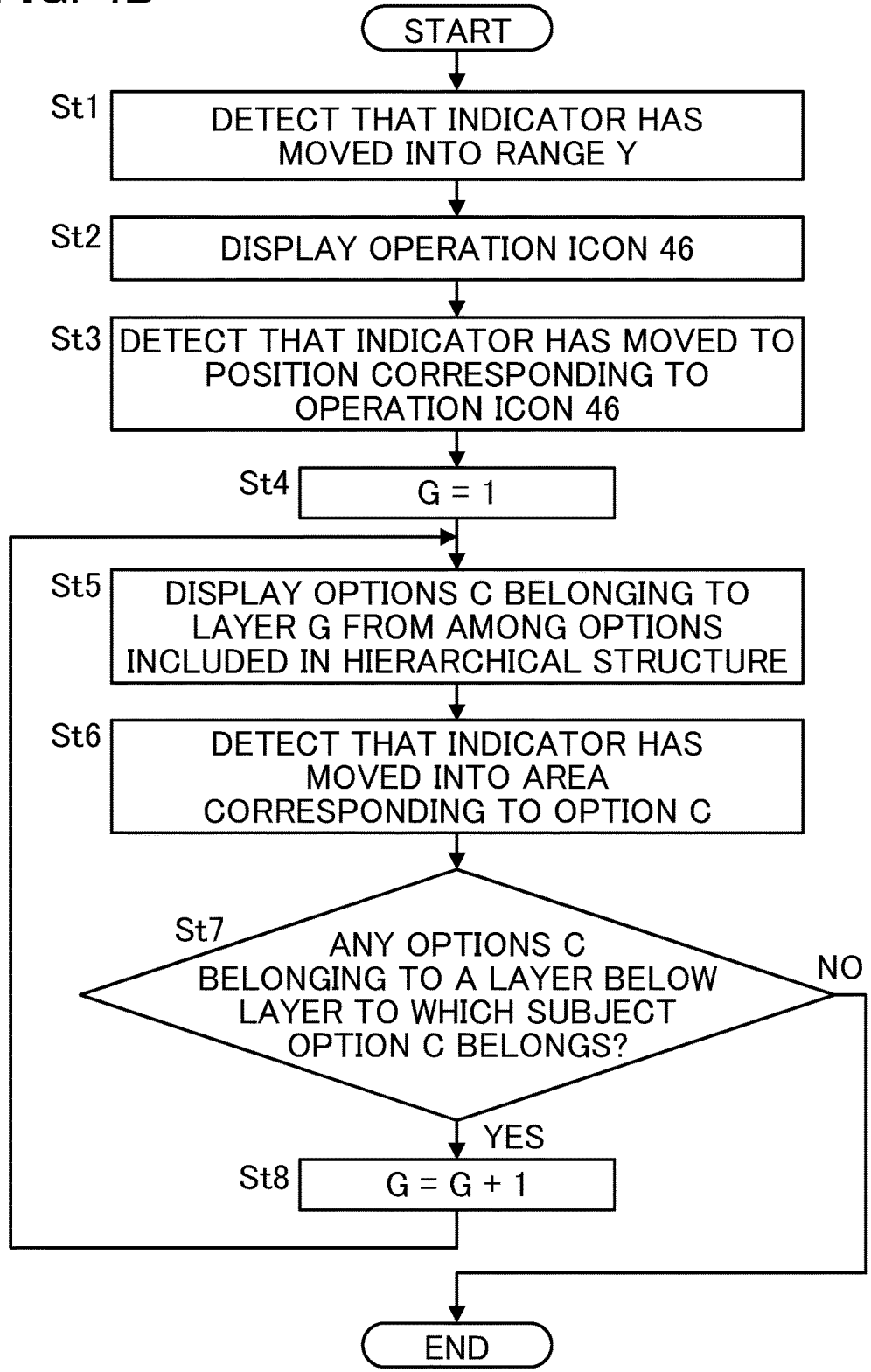
FIG. 4B is a flowchart showing the steps for displaying options for selecting a singing expression.
Figure 5:
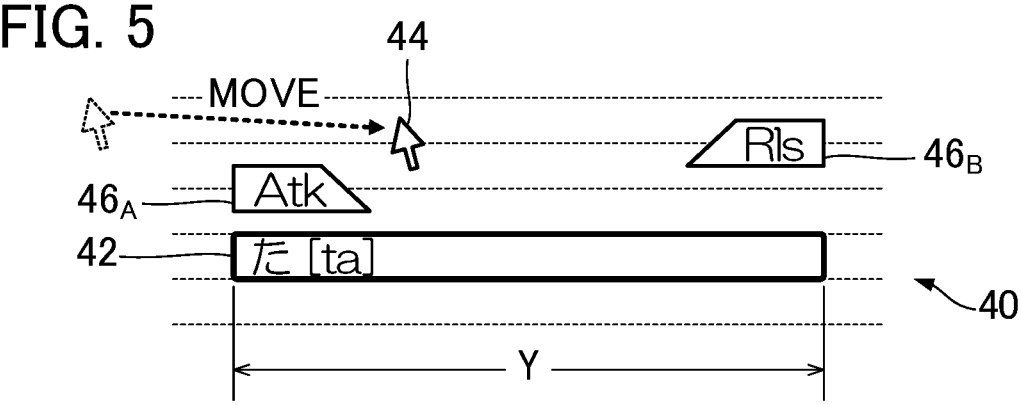
FIG. 5 is a diagram explaining a selection operation of a singing expression.

The selection handler 25 in the first embodiment causes the display device 14 to display, for each of layers in the above-described hierarchical structure, options C of the layer so that the user can select any one of the options C in a step-by-step manner. In this way, the selection handler 25 selects, as the singing expression to be applied to a voice to be synthesized (i.e., to be applied to a given note), a singing expression that corresponds to a combination of options C across the multiple layers, according to selection operations received from the user by the input device, the selection operations being performed in a layer-by-layer manner for the layers in the hierarchical structure. Referring to FIG. 4B, description will now be given of an overview of the steps of displaying, in a step-by-step manner, options included in the hierarchical structure of singing expressions. Upon detection that the indicator 44 has moved into a range Y between a start and an end of a note icon 42 (i.e., a range corresponding to the utterance period X2 of a note for which a singing expression is to be selected) (St1), the selection handler 25 causes the display device 14 to display an operation icon 46 (St2). The operation icon 46 is an example of a first operation icon and is an icon used by the user to select a singing expression, and will be explained later in more detail. Upon detection that the indicator 44 has moved to a position corresponding to the operation icon 46 (St3), the selection handler 25 sets a variable G to an initial value (e.g., one), the variable G indicating the level of the relevant layer (St4), and causes the display device 14 to display options C belonging to the layer (e.g., the first layer) indicated by the variable G (St5). Upon detection that the indicator 44 has moved into an area corresponding to any one option C among the displayed options C (St6), the selection handler 25, in a case where there is an option(s) C that belongs to a layer below the layer of the subject option C (i.e., a layer to which the subject option C belongs is not the lowest of the hierarchical structure that has as the starting point an option C selected in the highest layer (the first layer)) (St7: YES), adds one to the value of the variable G (St8) and returns to the process at step St5. At step St7, in a case where there is no option C that belongs to a layer below the layer of the subject option C (St7: NO), the display process comes to an end. In other words, the display process has been completed for options C in a hierarchical structure that has as its starting point the option C selected at the highest layer (the first layer).

In the following, referring to FIG. 5 to FIG. 15, details will be described of steps for a user to select a desired type of singing expression for a note to which the phonetic symbol X3 of "ta" has been applied (i.e., the steps for displaying options C to allow the user to select a singing expression to be applied to this note).

The user moves the indicator 44 close to a desired note for which a singing expression is to be selected (hereinafter, a "target note") by appropriately operating the input device 16. More specifically, when the indicator 44 moves into the range Y of the note icon 42 of the target note relative to the time-axis direction (St1), the selection handler 25 causes the display device 14 to display an operation icon $46_A$ (Atk) and an operation icon $46_B$ (Rls) as in the example shown in FIG. 5 (St2). When the indicator 44 is outside the range Y of the note, the operation icon $46_A$ and the operation icon $46_B$ are not displayed with respect to this note. The operation icon $46_A$ is an icon by which the user instructs the voice synthesis apparatus 100 (the editing screen 40) to select a singing expression for the beginning section of the target note. The operation icon $46_A$ is arranged close to a start (left-hand side end) of the note icon 42. The operation icon $46_B$ is an icon by which the user instructs the voice synthesis apparatus 100 to select a singing expression for the ending section of the target note. The operation icon $46_B$ is arranged close to an end (right-hand side end) of the note icon 42.

Figure 6:
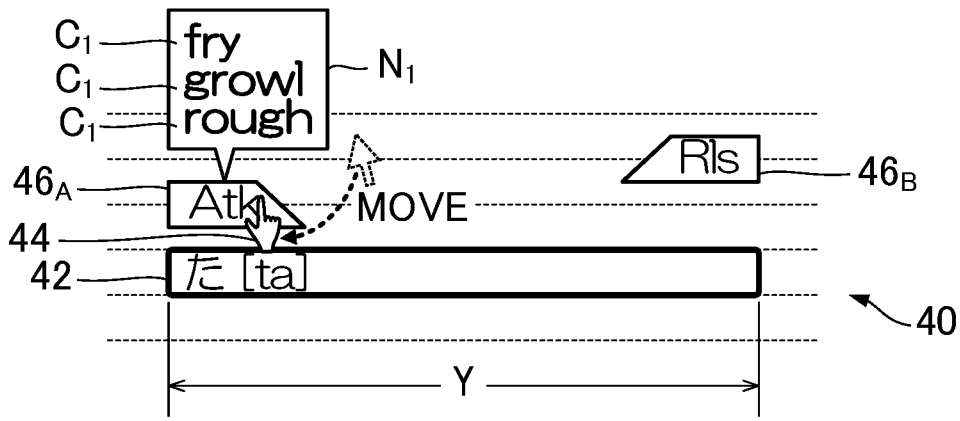
FIG. 6 is a diagram explaining a selection operation of a singing expression.
Figure 7:
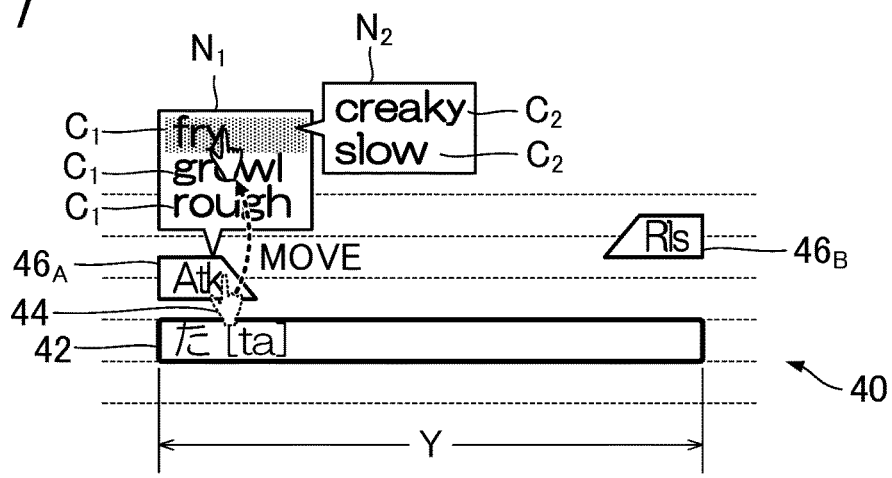
FIG. 7 is a diagram explaining a selection operation of a singing expression.
Figure 8:
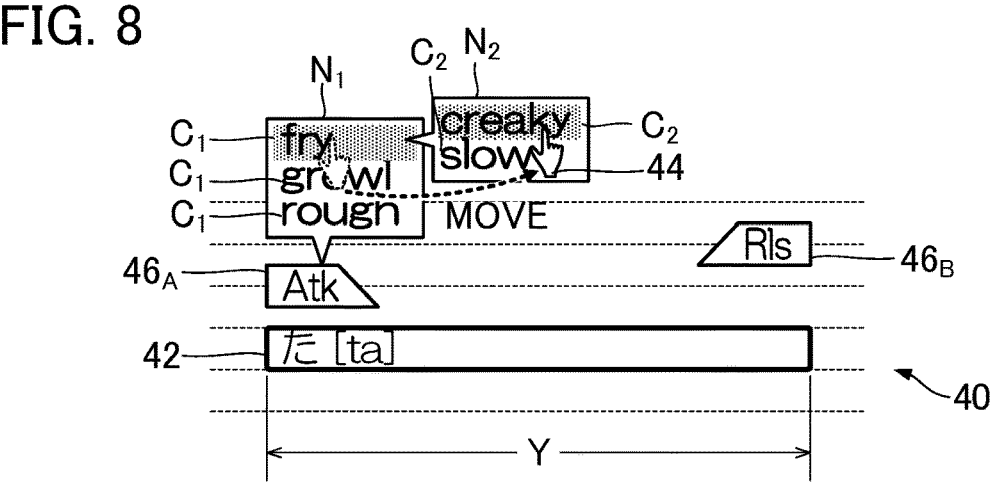
FIG. 8 is a diagram explaining a selection operation of a singing expression.

If the user wishes to select a singing expression for the beginning section, he/she moves the indicator 44 close to the operation icon $46_A$ by appropriately operating the input device 16. When the indicator 44 is moved to a position corresponding to the operation icon $46_A$ in accordance with the operation of the user (St3), the selection handler 25 controls the display device 14 to display, as in the example shown in FIG. 6, options $C_1$ (first options), namely, fry, growl, and rough, belonging to the first layer among the layers in the hierarchical structure (St5), for the user to select a singing expression to be applied to the target note from among singing expressions for the beginning section. For example, when the indicator 44 moves to a position overlapping that of the operation icon $46_A$, a balloon image $N_1$ is displayed close to the operation icon $46_A$. In the balloon image $N_1$, there are arranged in rows the options $C_1$ belonging to the first layer. Movement of the indicator 44 to a position corresponding to that of the operation icon $46_A$ (i.e., the trigger for displaying the options $C_1$) is not limited to the above example (i.e., the indicator 44 overlapping the operation icon $46_A$). For example, the options $C_1$ may be displayed when the indicator 44 moves to a predetermined area including the operation icon $46_A$. As shown in FIG. 6, a form of the indicator 44 changes (from a pointer to a hand) when the indicator 44 moves to a position corresponding to that of the operation icon $46_A$ or to a position corresponding to that of the operation icon $46_B$.

The user moves the indicator 44 close to a desired option $C_1$ among the options $C_1$ arranged in the balloon image $N_1$ by operating the input device 16. When the indicator 44 moves into an area corresponding to a given option $C_1$ belonging to the first layer (e.g., an area overlapping this option $C_1$) (St6), the selection handler 25 controls the display device 14 to display, as in an example shown in FIG. 7, options $C_2$ (second options), namely, slow and creaky, that correspond to the subject option $C_1$ (the option $C_1$ selected from among the options C0 and belong to the second layer, which is below the first layer, in the hierarchical structure (St7: YES, St8, and St5). More specifically, the selection handler 25 first causes a display format of the option $C_1$, "fry", which has been selected by the user moving the indicator 44 from among the options $C_1$ belonging to the first layer, to change (e.g., to be highlighted). Then, the selection handler 25 causes a balloon image $N_2$ to be displayed at the side of the balloon image $N_1$ of the first layer. In the balloon image $N_2$, there are arranged two options $C_2$, "slow" and "creaky", each of which belongs to the second layer, which is below the layer to which the subject option $C_1$ belongs. As will be understood from the above description, in the first embodiment, options $C_2$ that belong to the second layer and correspond to a given option $C_1$ are displayed on the display device 14 with an operation serving as a trigger, in which operation the indicator 44 is moved into an area corresponding to the given option $C_1$ (so-called mouse-over) from among the options $C_1$ in the first layer. In other words, no operation other than moving the indicator 44 is required (e.g., a mouse-click is not required) to display the options $C_2$ belonging to the second layer.

The user moves the indicator 44 close to a desired option $C_2$ among the options $C_2$ arranged in the balloon image $N_2$ by operating the input device 16. When the indicator 44 moves into an area corresponding to a given option $C_2$ belonging to the second layer (e.g., an area overlapping this option $C_2$) (St6), the selection handler 25, as in an example shown in FIG. 8, causes the display format of the option $C_2$, on which the indicator 44 is located, to change (e.g., to be highlighted). The option $C_2$ of "creaky", which is selected by the user in FIG. 8, belongs to the lowest layer of the hierarchical structure shown in FIG. 4A that has, as its starting point, the option $C_1$ of "fry", which has been selected by the user from the balloon image $N_1$ (St7:NO). Accordingly, options C belonging to an even lower layer will not be displayed even when the indicator 44 overlaps the subject option $C_2$. When the user performs a predetermined operation (e.g., a mouse-click) with the input device 16 while the indicator 44 overlaps the subject option $C_2$, the option $C_2$ will be selected. That is, the selection of a singing expression is finalized in correspondence with a combination of options C that have been selected in a layer-by-layer manner for the different layers by the user moving the indicator 44. For instance, in the examples shown in FIG. 5 to FIG. 8, the singing expression "fry-creaky" is selected. In a manner described above as an example, the selection handler 25 selects a singing expression to be applied to the target note from among singing expressions, after options C belonging to at least two layers including the highest layer (i.e., the first layer) are selected layer-by-layer by the user, wherein the singing expression is specified by a combination of the selected options C.

The selection handler 25 deletes both the balloon image $N_1$ and the balloon image $N_2$ from the editing screen 40 when the indicator 44 moves to a position that does not correspond to any of the following positions (e.g., outside the right edge of the balloon image $N_2$ in FIG. 8), namely: the position corresponding to the operation icon $46_A$; positions (or areas) corresponding to the options $C_1$ belonging to the first layer (fry, growl, and rough); and positions (or areas) corresponding to the options $C_2$ belonging to the second layer (slow and creaky). In other words, the user may cancel the selection of a singing expression by moving the indicator 44.

Figure 9:
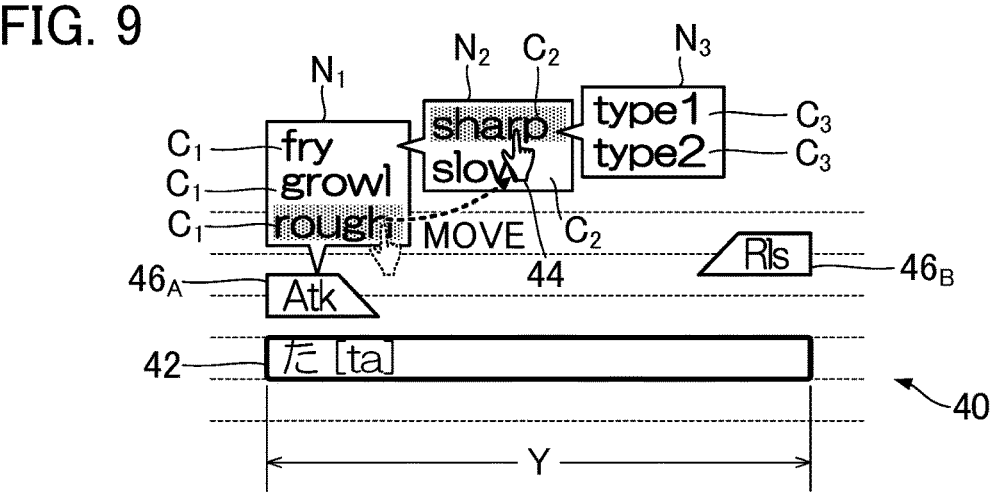
FIG. 9 is a diagram explaining a selection operation of a singing expression.
Figure 10:
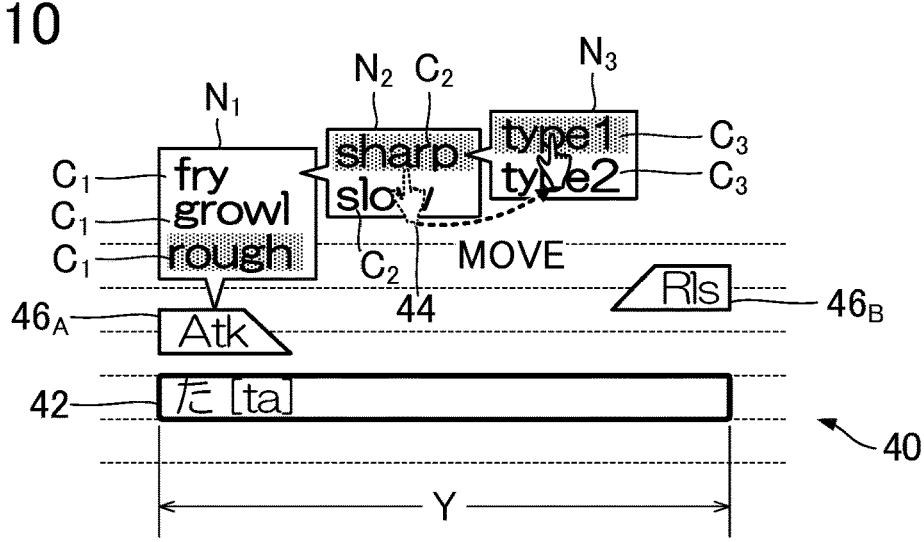
FIG. 10 is a diagram explaining a selection operation of a singing expression.

FIG. 9 shows an example in which the option $C_1$ of "rough" belonging to the first layer and the option $C_2$ of "sharp" belonging to the second layer are selected. As shown in the example in FIG. 4A, "rough-sharp" has lower-layer options, the options $C_3$ ("type 1" and "type 2") belonging to the third layer (St7: YES). Accordingly, when the indicator 44 overlaps one of the options $C_2$, such as "sharp", belonging to the second layer (St6), the selection handler 25 causes the display format of the subject option $C_2$ to change (e.g., to be highlighted), and causes the display device 14 to display the options $C_3$ (type 1 and type 2) that are situated below the selected option $C_2$ (St7: YES, St8, and St5). More specifically, a balloon image $N_3$ in which the two options $C_3$, "type 1" and "type 2", situated below the option $C_2$ of "sharp", is shown at the side of the balloon image $N_2$ of the second layer. As in the example shown in FIG. 10, when a predetermined operation (e.g., a mouse-click) is performed with the input device 16 while the indicator 44 is overlapping a given option $C_3$, the selection of a singing expression (e.g., "rough-sharp-type1") is finalized with the subject option $C_3$ being the end point.

After the singing expression for the beginning section has been determined by the above-steps, the information manager 26 appends, to the data unit U of the target note, expression information X4 that represents the selected singing expression. More specifically, the expression information X4 includes identification information E of the selected singing expression (e.g., information indicating the combination of the options C across the different layers) and control information Z that is set to an initial value.

Figure 11:
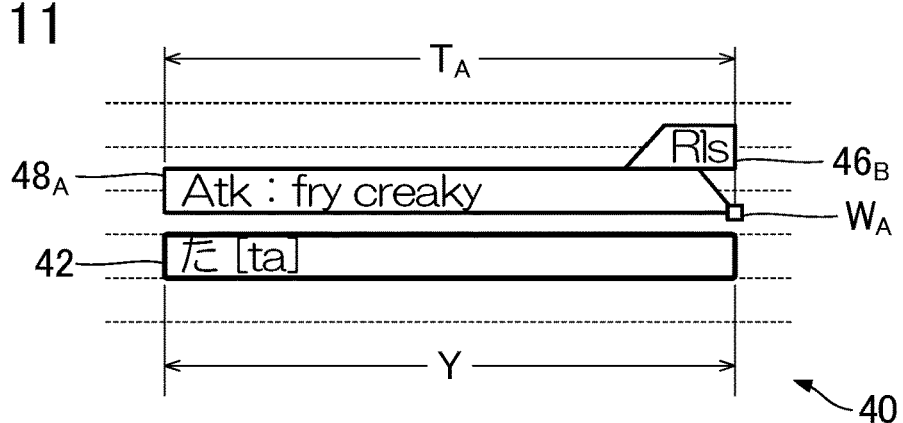
FIG. 11 is a diagram explaining a selection operation of a singing expression.
Figure 12:
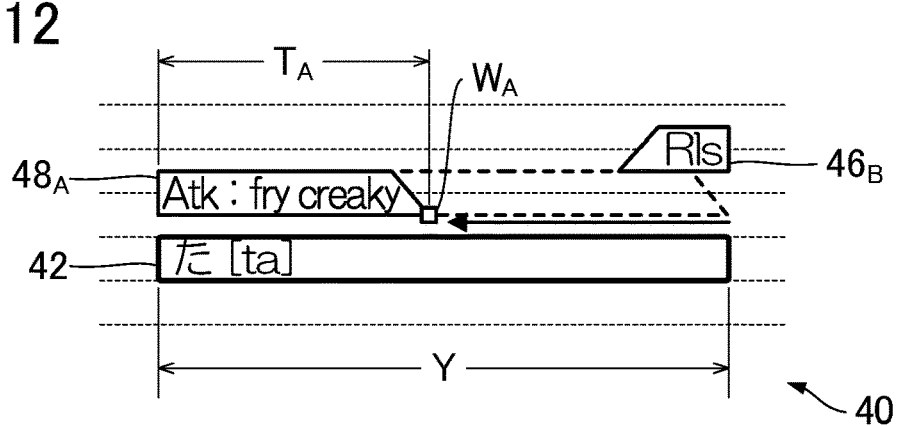
FIG. 12 is a diagram explaining a setting operation of an expression applied period.

In addition, after the selection of the singing expression for the beginning section has been finalized, the selection handler 25 changes the operation icon $46_A$ (an example of a first operation icon) of the target note to an operation icon $48_A$ (an example of a second operation icon) as in the example shown in FIG. 11. The operation icon $48_A$ is an image that represents a time length (hereinafter, "expression applied period") $T_A$ of the beginning section to which the singing expression selected by the user is applied. In other words, the expression applied period $T_A$ is a time length during which the selected singing expression is applied to the target note, and the display length of the operation icon $48_A$ along the time axis corresponds to the expression applied period $T_A$. The identification information E (the combination of options C across the multiple layers) of the singing expression having been selected by the user is applied to the operation icon $48_A$. More specifically, as in the example shown in FIG. 11, a character string that indicates the selected singing expression is displayed on the operation icon $48_A$.

An operation point $W_A$ that indicates the end of the expression applied period $T_A$ is displayed at the rear end (right-hand side end), along the time axis, of the operation icon $48_A$. As in the example shown in FIG. 12, the user may change the expression applied period $T_A$ within the range of the utterance period X2 by operating the input device 16 (e.g., by mouse-dragging) to move the operation point $W_A$. In other words, the display length of the operation icon $48_A$ is changed in accordance with an operation received from the user. In the following, the ratio of the expression applied period $T_A$ to the utterance period X2 is referred to as "duration ratio $\tau_A$". The information manager 26 sets, as the control information Z in the synthesis information S, the duration ratio $\tau_A$ of the expression applied period $T_A$ to the utterance period X2; here, the expression applied period $T_A$ is a time length from the start of the utterance period X2 of the target note to the operation point $W_A$. At the initial state before being moved by the user, the operation point $W_A$ is located at the end of the utterance period X2. In other words, the initial value of the duration ratio $\tau_A$ is "1" (100%).

In the above description, selection of a singing expression and adjustment of the control information Z are described with respect to the beginning section of the utterance period X2 of the target note. The operations required for selection of a singing expression and adjustment of the control information Z with respect to the ending section of the utterance period X2 are similar to those for the beginning section. In other words, as in the example shown in FIG. 13, when the indicator 44 overlaps the operation icon $46_B$ that corresponds to the ending section, the option $C_1$ (first option), namely, soft, belonging to the first layer with respect to singing expressions for the ending section is displayed in a balloon image $N_1$. When the indicator 44 moves to an area that corresponds to the subject option $C_1$, options $C_2$ (second options), namely, long and short, belonging to the second layer, which is below the layer of the subject option $C_1$, are displayed in a balloon image $N_2$.

Figure 13:
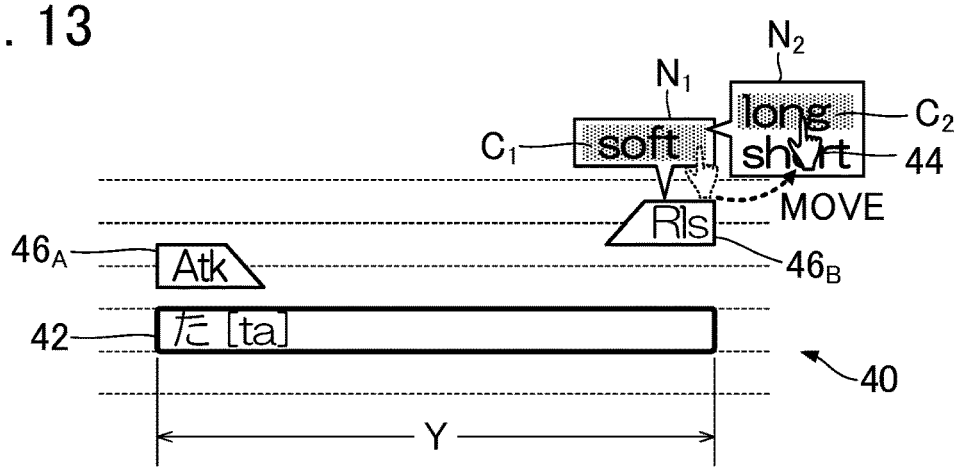
FIG. 13 is a diagram explaining one example of an editing screen in a case where a singing expression is selected.
Figure 14:
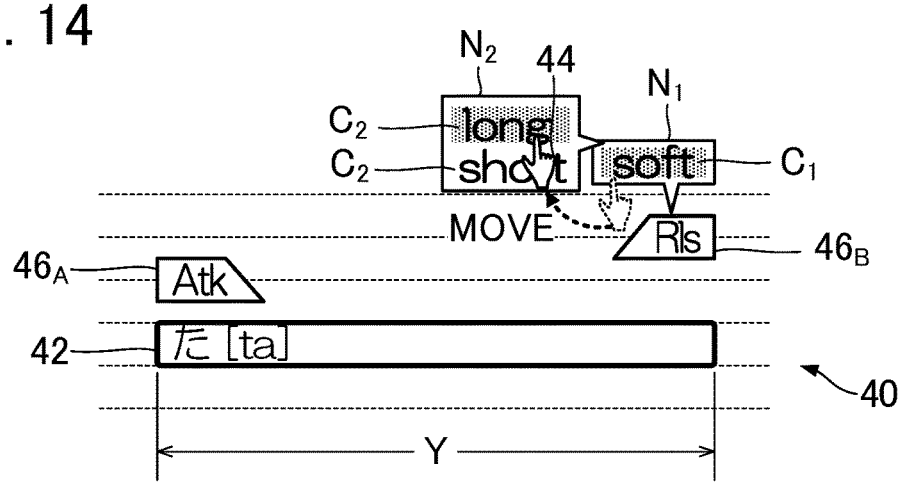
FIG. 14 is a diagram explaining another example of an editing screen in a case where a singing expression is selected.

As in the example shown in FIG. 13, it may sometimes be difficult for the user to visually recognize the options $C_2$ (long and short) if the balloon image $N_2$ is displayed at a side (e.g., the right side) of the balloon image $N_1$, resulting in the balloon image $N_2$ being located outside the display area of the display device 14. Considering the above circumstances, a configuration in which the selection handler 25 causes the balloon image $N_2$ to be displayed at the left side of the balloon image $N_1$ (i.e., near to the center of the note icon 42), as in the example shown in FIG. 14, may be preferable.

Figure 15:
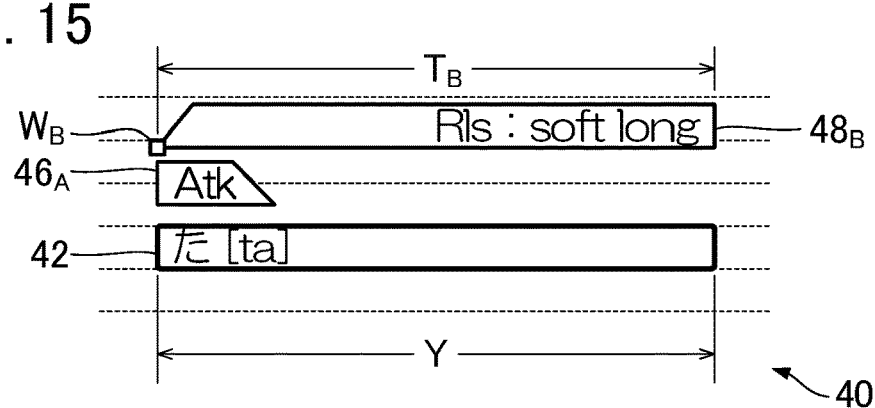
FIG. 15 is a diagram explaining a setting operation of an expression applied period.

After the singing expression for the ending section has been determined by the above steps, the selection handler 25 changes the operation icon $46_B$ (an example of a first operation icon) to an operation icon $48_B$ (an example of a second operation icon) as shown in FIG. 15. The operation icon $48_B$, similarly to the operation icon $48_A$, is an image to which the identification information E of the singing expression selected by the user is applied (e.g., a character string that indicates the selected singing expression is displayed on the operation icon $48_B$), and is for use by the user to adjust an expression applied period $T_B$ of the ending section to which the selected singing expression is applied. The display length of the operation icon $48_B$ along the time axis corresponds to the expression applied period $T_B$, and the display length of the operation icon $48_B$ is changed in accordance with an operation received from the user. More specifically, the user may give an instruction on a desired expression applied period $T_B$ by operating the input device 16 (e.g., by mouse-dragging) to move an operation point $W_B$ that is attached to the start side of the operation icon $48_B$. The information manager 26 sets, as the control information Z in the synthesis information S, a ratio (duration ratio $\tau_B$) of the expression applied period $T_B$ to the utterance period X2; here, the expression applied period $T_B$ is a time length from the operation point $W_B$ to the end of the utterance period X2 within the utterance period X2 of the target note.

As will be understood from the above description, in accordance with an instruction that the instruction receiver 22 receives from the user via the input device 16, the information manager 26 sets variables in the control information Z (the expression applied period $T_A$ and the expression applied period $T_B$), the control information Z relating to the process of applying a sound component (sound unit Q) to the voice of a certain note to be synthesized, the sound component having a singing expression selected by the user with respect to the note.

Figure 16:
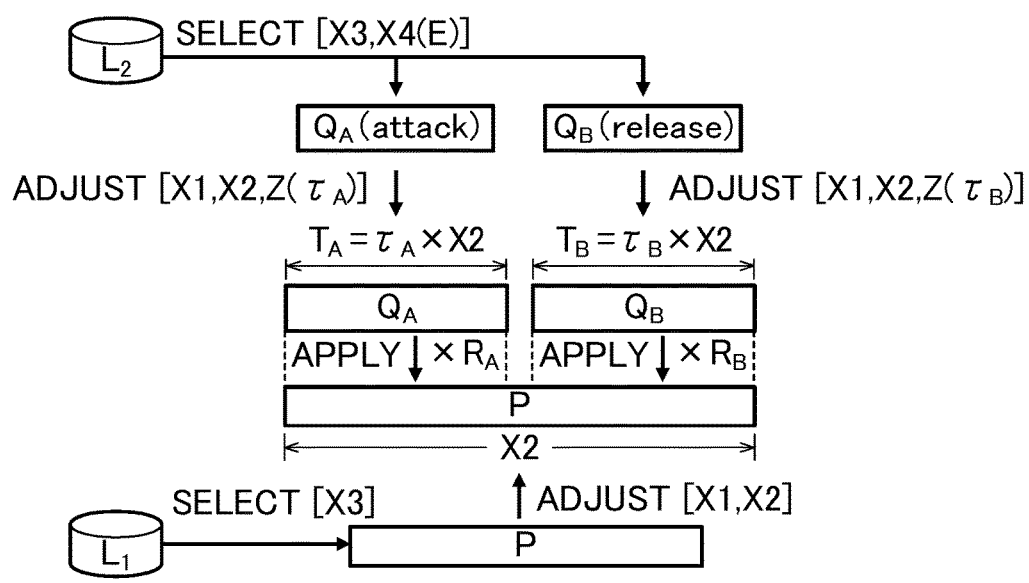
FIG. 16 is a diagram explaining how a voice synthesizer operates.

The voice synthesizer 28 in FIG. 1 generates a voice signal V using the sound unit groups L ($L_1$ and $L_2$) stored in the storage device 12 and the synthesis information S. FIG. 16 is a diagram explaining the process executed by the voice synthesizer 28 with respect to one of notes specified by the synthesis information S.

As shown in FIG. 16, the voice synthesizer 28 selects from the sound unit group $L_1$ a sound unit P (a first sound unit) that corresponds to a phonetic symbol X3 specified by the synthesis information S with respect to the subject note, and adjusts the sound unit P such that the sound unit P has a pitch X1 and an utterance period X2 of the subject note, with the pitch X1 and the utterance period X2 being specified by the synthesis information S. The voice synthesizer 28 selects from the sound unit group $L_2$, for each of the beginning section (e.g., the attack) and the ending section (e.g., the release), a sound unit Q (a second sound unit) that has the singing expression specified by the identification information E included in the expression information X4 of the note and corresponds to the vowel of the phonetic symbol X3. In FIG. 16, the sound unit Q for the beginning section is represented by a symbol $Q_A$, and the sound unit Q for the ending section is represented by a symbol $Q_B$. The voice synthesizer 28 adjusts the sound unit $Q_A$ and the sound unit $Q_B$ such that the sound units $Q_A$ and $Q_B$ each have the pitch X1. The voice synthesizer 28 additionally extends or contracts the sound unit $Q_A$ such that the time length of the beginning-section sound unit $Q_A$ is equivalent to the expression applied period $T_A$, and extends or contracts the sound unit $Q_B$ such that the time length of the ending-section sound unit $Q_B$ is equivalent to the expression applied period $T_B$. The expression applied period $T_A$ is a time length obtained by multiplying the utterance period X2 by the duration ratio $\tau_A$ specified by the control information Z of the expression information X4. The expression applied period $T_B$ is a time length obtained by multiplying the utterance period X2 by the duration ratio $\tau_B$ specified by the control information Z of the expression information X4.

After the above adjustments are complete, the voice synthesizer 28 mixes the adjusted beginning-section sound unit $Q_A$ with the start side of the sound unit P (the beginning section of the sound unit P), and also mixes the adjusted ending-section sound unit $Q_B$ with the end side of the sound unit P (the ending section of the sound unit P). In detail, the sound unit $Q_A$ is applied to the sound unit P at an application ratio $R_A$, and the sound unit $Q_B$ is applied to the sound unit P at an application ratio $R_B$. The application ratios $R_A$ and $R_B$ are each a degree to which the sound unit $Q_A$ or $Q_B$, respectively, is applied to the sound unit P, and are each set to a predetermined value. In other words, the application ratio $R_A$ is a weighted value for the sound unit $Q_A$, and the application ratio $R_B$ is a weighted value for the sound unit $Q_B$. A voice signal V is generated by interconnecting, along the time axis, sound units P that have been generated by the above steps sequentially for the notes included in the synthesis information S.

Since the vocal characteristics differ between a sound unit Q and a sound unit P to which the sound unit Q is applied, the user may notice discontinuity in sound at least either at the start of or at the end of the sound unit Q. To minimize such discontinuity in sound, the sound unit Q may be cross-faded into the sound unit P.

The singing voice of the synthesized song is reproduced by voice signals V generated by the voice synthesizer 28 being supplied to the sound output device 18.

The above-described configuration allows the user to select one of multiple singing expressions as a result of allowing the user to select an option C for each layer in a layer-by-layer manner. Therefore, the user is able to easily find and select a desired singing expression, as compared to a configuration in which all possible types of singing expressions selectable by the user are displayed, for the user to select a single desired singing expression from among them. Furthermore, in the above configuration, compared to a configuration in which all possible types of singing expressions are displayed, the number of types of singing expressions displayed at a time can be reduced, and thus an area required to display singing expressions also can be reduced. Thus, this configuration is preferably suited for use on a display device (e.g., a display device of a mobile terminal) that has a relatively small display area.

In addition, when the indicator 44 is moved into an area that corresponds to an option C belonging to a layer of the hierarchical structure, options C that are situated below the subject option C are displayed on the display device 14. Accordingly, the user can select an option C for each layer without need to perform any operation (e.g., a mouse-click) other than moving the indicator 44. Therefore, compared to a configuration in which the user selects a desired option by performing an operation additional to moving the indicator 44, less of a difficulty is imposed on the user in selecting one of multiple singing expressions.

Moreover, in the above-described embodiment, when as a result of an operation performed by the user the indicator 44 moves into a range Y between the start and the end of a note icon 42, operation icons ($46_A$ and $46_B$) are displayed, and when the indicator 44 moves to a position corresponding to an operation icon ($46_A$ or $46_B$), options C belonging to the highest layer of the corresponding hierarchical structure are displayed. Thus, in contrast to a configuration in which the operation icons $46_A$ and $46_B$ are continuously shown, the editing screen 40 is relatively simple. Moreover, when the indicator 44 moves to a position corresponding to an operation icon ($46_A$ or $46_B$), options C belonging to the highest layer are displayed (i.e., selection of an option for each layer by the user is initiated). As a result, less of a difficulty is imposed on the user as compared to a configuration in which the options C belonging to the highest layer are displayed when an operation (e.g., a mouse-click) other than moving the indicator 44 is applied to the operation icon ($46_A$ or $46_B$).

Furthermore, the options C belonging to the layers for selecting a singing expression for the beginning section of a note are displayed on the start side of the note icon 42, and the options C belonging to the layers for selecting a singing expression for the ending section of the note are displayed on the end side of the note icon 42. Accordingly, the user is able to understand both visually and intuitively the relationship between the portion (start or end) and the singing expression to be applied to the portion.

In addition, the voice signal V that represents the synthesized voice (the singing voice) is generated by mixing multiple sound units (a sound unit P and a sound unit Q) having different vocal characteristics. More specifically, the voice signal V is generated by mixing a sound unit Q (the second sound unit) that has a singing expression selected by the user with the sound unit P (the first sound unit). Thus, compared to a configuration in which a voice signal V is generated by modifying a single sound unit (e.g., a sound unit P), less deterioration of the voice occurs, and a more natural-sounding voice is synthesized.

Second Embodiment

A second embodiment of the present invention will now be explained. In the first embodiment, an expression applied period $T_A$ and an expression applied period $T_B$ are given as examples of variables in the control information Z. In the second embodiment, the user may adjust, as the control information Z, a variety of variables that relate to the application of singing expressions. In the following modes, which are described as examples, elements that are the same as those in the first embodiment regarding their effect and function are denoted by the same reference symbols as used in the first embodiment, and detailed explanation thereof will be omitted as appropriate. Description of the selection of singing expressions also will be omitted, since the selection is substantially the same as in the first embodiment.

Figure 17:
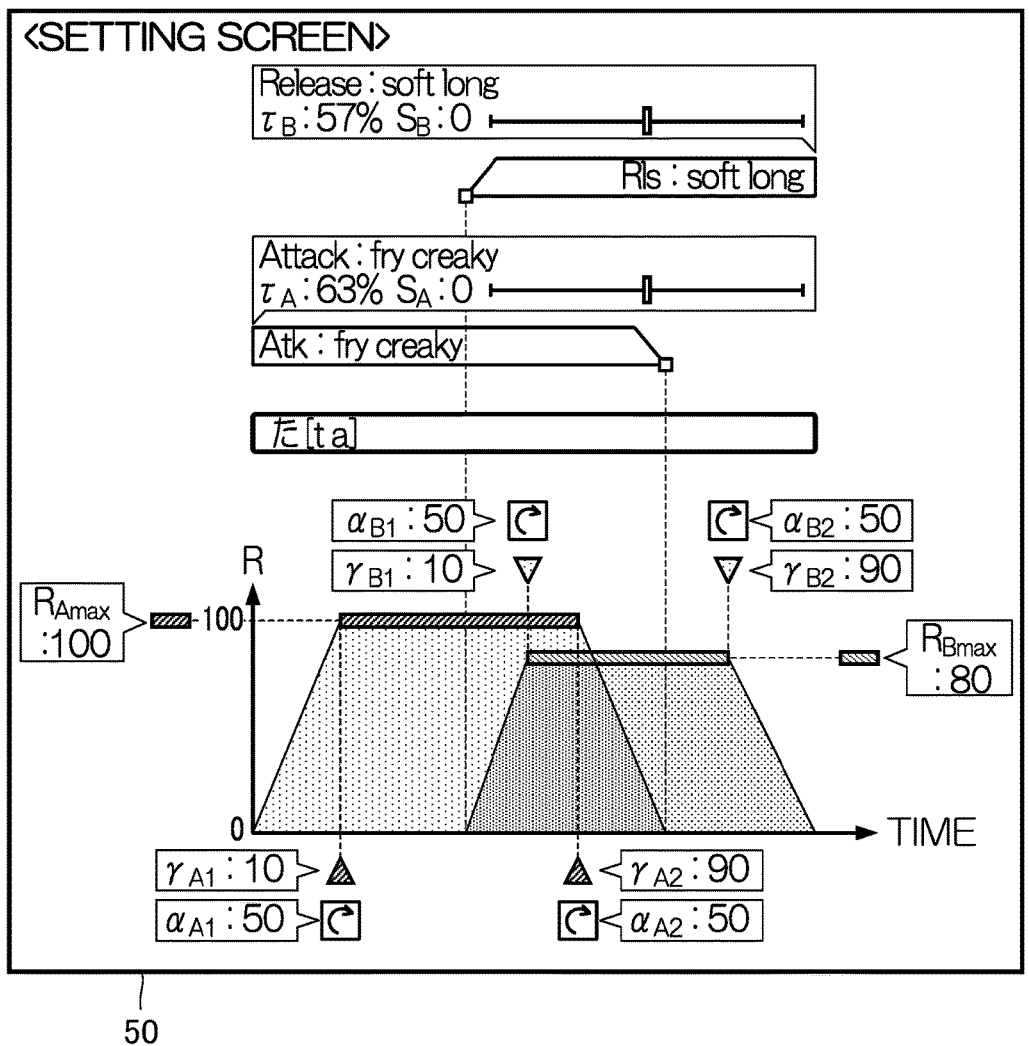
FIG. 17 is an example display of a control information setting screen according to a second embodiment.
Figure 18:
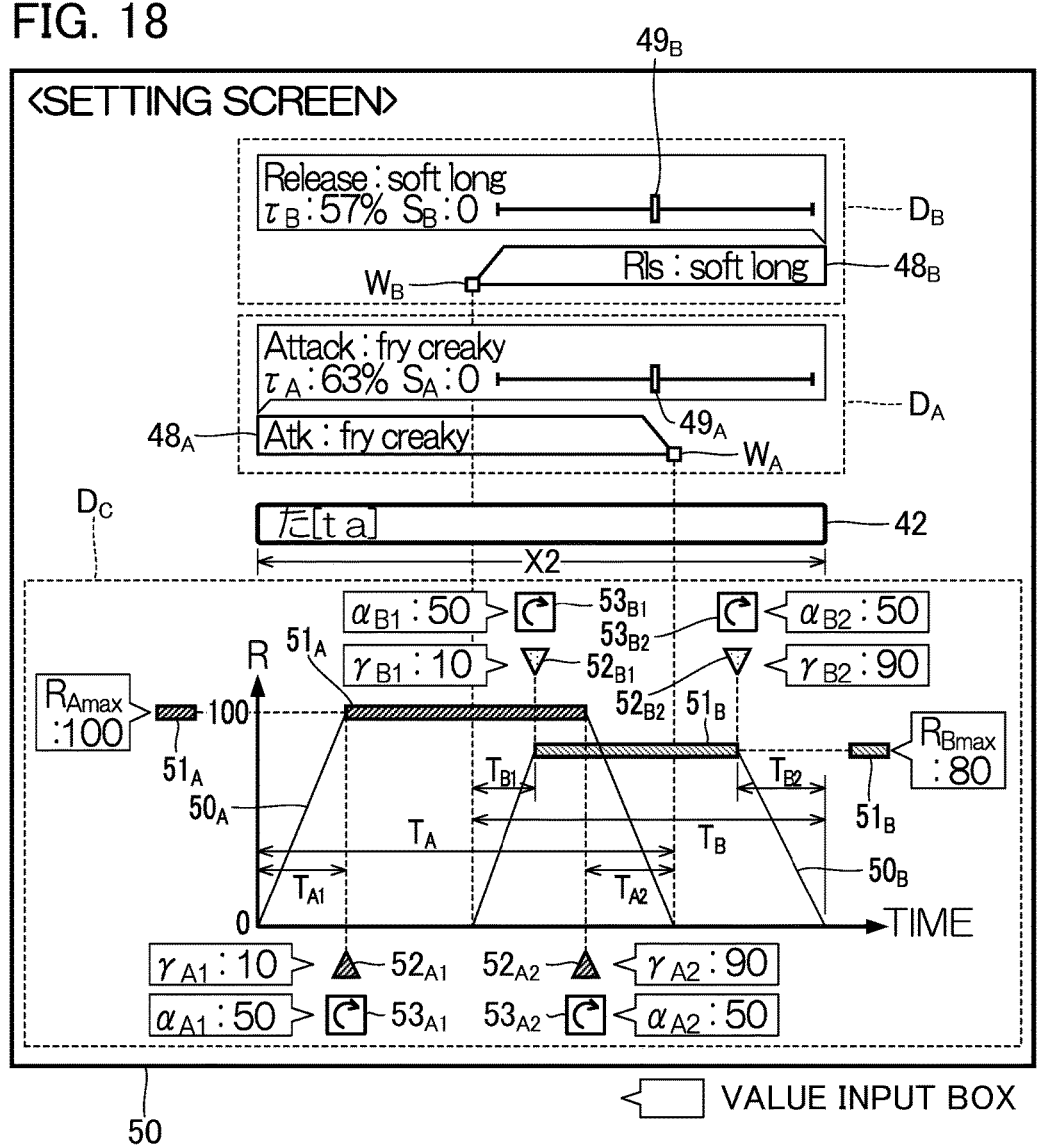
FIG. 18 is a diagram explaining the control information setting screen.

FIG. 17 shows an example display of a screen (control information setting screen) 50 for the user to set the control information Z in the second embodiment. FIG. 18 is a diagram of the control information setting screen 50 shown in FIG. 17 with supportive explanatory elements, such as reference symbols, which are added to aid description. In FIG. 18, shading, etc., of each element is omitted so that the explanation of the control information setting screen 50 can be emphasized.

When the user inputs into the input device 16 an instruction to perform detailed settings of the control information Z after selecting a desired note (target note), the display controller 24 causes the display device 14 to display the control information setting screen 50 of FIG. 17. As shown in FIG. 18, together with a note icon 42 that represents the target note, each of a region $D_A$, a region $D_B$, and a region $D_C$, is arranged on the control information setting screen 50. The region $D_A$ is a region for receiving instructions from the user on setting the control information Z in relation to the application of a singing expression to the beginning section of the target note. The region $D_B$ is a region for receiving instructions from the user on setting the control information Z in relation to the application of a singing expression to the ending section of the target note.

In the region $D_A$, an operation icon $48_A$ and an operator $49_A$ are displayed. In a manner similar to that described above where the user performs an operation on the editing screen 40, the information manager 26 sets the duration ratio $\tau_A$ of the expression applied period $T_A$ in accordance with an operation performed by the user to move the operation point $W_A$ of the operation icon $48_A$. By performing an operation on the control information setting screen 50 via the input device 16, the user can move the operator $49_A$ in the time-axis direction. The information manager 26 sets a speed variable $S_A$ in accordance with a position of the operator $49_A$. The speed variable $S_A$ defines a degree of extension or contraction in the process of adjusting the time length of a sound unit Q such that it becomes equivalent to the expression applied period $T_A$. The speed variable $S_A$ also defines which of the start side or the end side of the sound unit Q (sound component) is to be extended or contracted. The speed variable $S_A$ may be variably set from an initial value (typically, zero) towards both the positive and negative sides (e.g., in a range from −50 to +50).

Figure 19A:
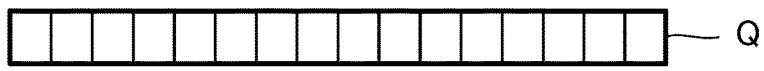
FIG. 19A is a diagram explaining a relationship between a speed variable and the extension/contraction of a sound unit.
Figure 19B:
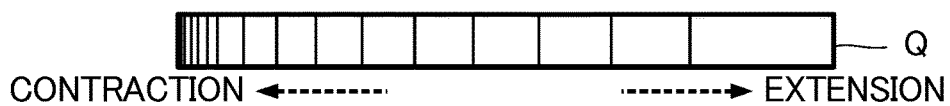
FIG. 19B is a diagram explaining a relationship between a speed variable and the extension/contraction of a sound unit.
Figure 19C:
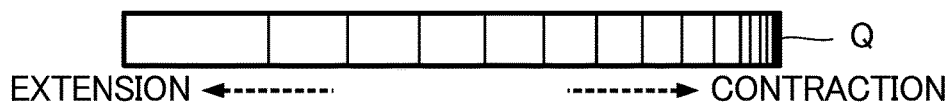
FIG. 19C is a diagram explaining a relationship between a speed variable and the extension/contraction of a sound unit.

FIGS. 19A, 19B, and 19C are diagrams explaining a relationship between the speed variable $S_A$ and the sound unit Q of a singing expression. In FIGS. 19A to 19C, examples are shown in which the time length of the sound unit Q for the beginning section is extended and/or contracted within the expression applied period $T_A$. When the speed variable $S_A$ is set to the initial value (FIG. 19A), the time length of the sound unit Q of the singing expression is adjusted so as to be equivalent to the expression applied period $T_A$ by being extended or contracted uniformly across all of the sections of the sound unit Q. When the speed variable $S_A$ is changed from the initial value, as shown in FIGS. 19B and 19C, the time length of the sound unit Q is extended and contracted non-uniformly (non-linearly) depending on a position along the time axis. More specifically, when the speed variable $S_A$ is set to a value above the initial value (i.e., a positive number) (FIG. 19B), the time length of the sound unit Q is extended and contracted non-uniformly such that the closer the sections of the sound unit Q are to the start of the sound unit Q, the more contracted are the sections, and the closer the sections of the sound unit Q are to the end of the sound unit Q, the more extended are the sections. The greater the absolute value of the speed variable $S_A$, the higher the degree of contraction at the start side and the higher the degree of extension at the end side. In contrast, when the speed variable $S_A$ is set to a value below the initial value (i.e., a negative number) (FIG. 19C), the time length of the sound unit Q is extended and contracted non-uniformly such that the closer the sections of the sound unit Q are to the end of the sound unit Q, the more contracted are the sections, and the closer the sections of the sound unit Q are to the start of the sound unit Q, the more extended are the sections. The greater the absolute value of the speed variable $S_A$, the higher the degree of contraction at the end side and the higher the degree of extension at the start side. As described in the above examples, the greater the speed variable $S_A$ is, the more contraction there is at the start side of the sound unit Q. As a result, the attack phase of the sound is accelerated immediately after the start of the sound unit Q. Thus, the speed variable $S_A$ can be expressed as a variable that defines the speed of the attack phase of the sound of the sound unit Q for the beginning section.

The above examples concern the designation of the speed variable $S_A$ for the beginning section of the target note. In a similar manner, with regard to the ending section, the information manager 26 sets a speed variable $S_B$ in accordance with an operation performed by the user on the control information setting screen 50 (an operator $49_B$ in the region $D_B$). Regarding the ending section, a relationship between whether the speed variable $S_B$ is a positive or a negative number and the position of the contraction in the sound unit Q (either at the start side or the end side) is reversed as compared to that regarding the speed variable $S_A$ for the beginning section. More specifically, when the speed variable $S_B$ is above an initial value ($S_B$>0), the closer the sections of the sound unit Q are to the end of the sound unit Q, the more contracted are the sections; and conversely, the closer the sections of the sound unit Q are to the start of the sound unit Q, the more extended are the sections. When the speed variable $S_B$ is below the initial value ($S_B$<0), the closer the sections of the sound unit Q are to the start of the sound unit Q, the more contracted are the sections; and conversely, the closer the sections of the sound unit Q are to the end of the sound unit Q, the more extended are the sections. The speed variable $S_B$ has a tendency similar to the speed variable $S_A$ such that the greater the absolute value of the speed variable $S_B$, the higher the degree of extension and contraction. As will be understood from the above description, the greater the speed variable $S_B$, the more contraction there is at the end side of the sound unit Q for the ending section of the target note. As a result, the release phase of the sound is accelerated immediately before the end of the sound unit Q. Thus, the speed variable $S_B$ can be expressed as a variable that defines the speed of the release phase of the sound of the sound unit Q for the ending section.

The region $D_C$ in FIG. 18 is a region for receiving from the user instructions on setting temporal changes for application ratios R ($R_A$ and $R_B$). The region $D_C$ is shown below the note icon 42 and within the control information setting screen 50. Within the region $D_C$, a transition image $50_A$ and a transition image $50_B$ are displayed inside a region in which a time axis (horizontal axis) and an axis indicating the value of the application ratio R (vertical axis) are set. The transition image $50_A$ is a line graph representing the temporal change of the application ratio $R_A$ of a singing expression (sound unit $Q_A$) for the beginning section of the target note. The transition image $50_B$ is a line graph representing the temporal change of the application ratio $R_B$ of a singing expression (sound unit $Q_B$) for the ending section of the target note. As shown in the examples of FIGS. 17 and 18, the transition image $50_A$ and the transition image $50_B$ may overlap each other. The transition image $50_A$, the transition image $50_B$, and the note icon 42 are displayed under the common time axis.

As shown in FIG. 18, the transition image $50_A$ is a trapezoid that extends across the expression applied period $T_A$ of the singing expression for the beginning section within the utterance period X2 of the target note ($T_A = \tau_A \times X2$). More specifically, as shown in FIG. 18, the change over time in the application ratio $R_A$ of the singing expression applied to the beginning section is represented in the transition image $50_A$, the change being an increase from zero at the start of the expression applied period $T_A$ to a maximum value $R_{Amax}$, the sustenance of the maximum value $R_{Amax}$ thereafter, and a decrease, from somewhere in the middle of the expression applied period $T_A$, from the maximum value $R_{Amax}$ to zero at the end of the expression applied period $T_A$. In the following, a period from the start of the expression applied period $T_A$ to the point at which the application ratio $R_A$ reaches the maximum value $R_{Amax}$ will be referred to as a leading edge period $T_{A1}$; and a period from the point at which the application ratio $R_A$ begins to decrease from the maximum value $R_{Amax}$ to the end of the expression applied period $T_A$ will be referred to as a trailing edge period $T_{A2}$. By performing operations on the transition image $50_A$, the user can specify, as the control information Z for the beginning section, the maximum value $R_{Amax}$ of the application ratio $R_A$, the temporal change of the application ratio $R_A$ at the start side of the expression applied period $T_A$ (a duration ratio $\gamma_{A1}$ and a transition coefficient $\alpha_{A1}$), and the temporal change of the application ratio $R_A$ at the end side of the expression applied period $T_A$ (a duration ratio $\gamma_{A2}$ and a transition coefficient $\alpha_{A2}$).

The transition image $50_B$ is a trapezoid that extends across the expression applied period $T_B$ of the singing expression for the ending section within the utterance period X2 of the target note ($T_B = \tau_B \times X2$). More specifically, as shown in FIG. 18, the change over time in the application ratio $R_B$ of the singing expression applied to the ending section is represented in the transition image $50_B$, the change being an increase from zero at the start of the expression applied period $T_B$ to a maximum value $R_{Bmax}$, the sustenance of the maximum value $R_{Bmax}$ thereafter, and a decrease, from somewhere in the middle of the expression applied period $T_B$, from the maximum value $R_{Bmax}$ to zero at the end of the expression applied period $T_B$. In the following, a period from the start of the expression applied period $T_B$ to the point at which the application ratio $R_B$ reaches the maximum value $R_{Bmax}$ will be referred to as a leading edge period $T_{B1}$; and a period from the point at which the application ratio $R_B$ begins to decrease from the maximum value $R_{Bmax}$ to the end of the expression applied period $T_B$ will be referred to as a trailing edge period $T_{B2}$. The user can specify, as the control information Z for the ending section, by performing operations on the transition image $50_B$, the maximum value $R_{Bmax}$ of the application ratio $R_B$, the temporal change of the application ratio $R_B$ at the start side of the expression applied period $T_B$ (a duration ratio $\gamma_{B1}$ and a transition coefficient $\alpha_{B1}$), and the temporal change of the application ratio $R_B$ at the end side of the expression applied period $T_B$ (a duration ratio $\gamma_{B2}$ and a transition coefficient $\alpha_{B2}$).

The display controller 24 updates the transition image $50_A$ and the transition image $50_B$ after the control information Z is modified. The user may change the control information Z by performing operations on the different operators ($51_A$, $51_B$, $52_{A1}$, $52_{A2}$, $52_{B1}$, $52_{B2}$, $53_{A1}$, $53_{A2}$, $53_{B1}$, and $53_{B2}$) of the control information setting screen 50, or by directly inputting values of the control information Z into value input boxes shown as examples in FIG. 18. In the following, settings of the control information Z will be described in detail.

Maximum Values of Application Ratios $R_{Amax}$, $R_{Bmax}$

The user can move the operator $51_A$ vertically by operating the input device 16. In the example shown in FIG. 18, illustrated are an operator $51_A$ that corresponds to the upper edge of the transition image $50_A$, and an operator $51_A$ that is arranged near the transition image $50_A$. The information manager 26 sets the maximum value $R_{Amax}$ of the application ratio $R_A$ in accordance with the position of the operator $51_A$ in the vertical direction. The maximum value $R_{Amax}$ is set within a range of between zero and one hundred, inclusive. Similarly, the information manager 26 sets the maximum value $R_{Bmax}$ of the application ratio $R_B$ for the ending section in accordance with an operation performed by the user on the operator $51_B$.

Duration Ratios $\gamma_{A1}$, $\gamma_{A2}$, $\gamma_{B1}$, $\gamma_{B2}$

By operating the input device 16, the user can move the operator $52_{A1}$ that represents the end of the leading edge period $T_{A1}$ along the time-axis direction. The information manager 26 sets the duration ratio $\gamma_{A1}$ to be variable in accordance with a ratio (%) of the leading edge period $T_{A1}$ to the expression applied period $T_A$, the leading edge period $T_{A1}$ being from the start of the expression applied period $T_A$ of the beginning section to the point at which the operator $52_{A1}$ is located. In other words, the application ratio $R_A$ increases from zero to the maximum value $R_{Amax}$ over the leading edge period $T_{A1}$, which is a time length equivalent to the product of the expression applied period $T_A$ and the duration ratio $\gamma_{A1}$.

Similarly, the user can move the operator $52_{A2}$ that represents the start of the trailing edge period $T_{A2}$ along the time-axis direction. The information manager 26 sets the duration ratio $\gamma_{A2}$ to be a ratio of a certain period to the expression applied period $T_A$, the certain period being from the start of the expression applied period $T_A$ of the beginning section to a point at which the operator $52_{A2}$ is located. In other words, the application ratio $R_A$ decreases from the maximum value $R_{Amax}$ to zero over the trailing edge period $T_{A2}$, which is from a certain time point to the end of the expression applied period $T_A$, the certain time point being a time point at which the time length equivalent to the product of the expression applied period $T_A$ and the duration ratio $\gamma_{A2}$ has passed from the start of the expression applied period $T_A$. The same applies for the ending section, and the following variables are set according to the operation performed by the user: the ratio (duration ratio $\gamma_{B1}$) of the leading edge period $T_{B1}$ to the expression applied period $T_B$, the leading edge period $T_{B1}$ being from the start of the expression applied period $T_B$ to the point at which the operator $52_{B1}$ is located; and the ratio (duration ratio $\gamma_{B2}$) of a certain period to the expression applied period $T_B$, the certain period being from the start of the expression applied period $T_B$ to the point at which the operator $52_{B2}$ is located. In an alternative configuration, the duration ratio $\gamma_{A2}$ may be the ratio of the trailing edge period $T_{A2}$ to the expression applied period $T_A$; or the duration ratio $\gamma_{B2}$ may be the ratio of the trailing edge period $T_{B2}$ to the expression applied period $T_B$.

Figure 20:
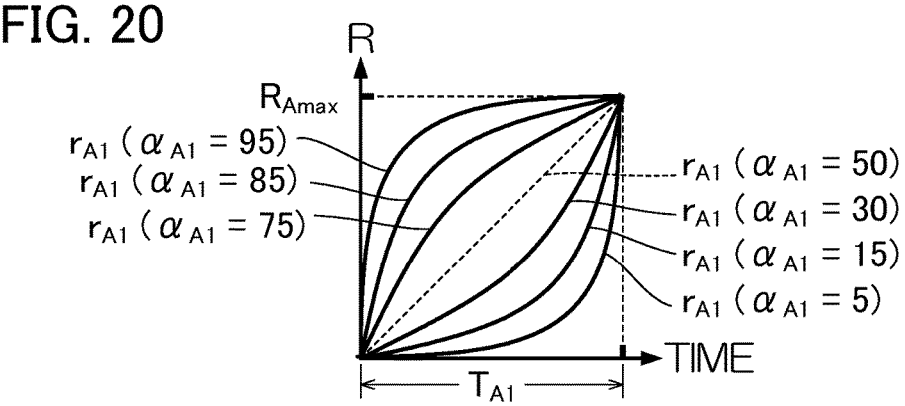
FIG. 20 is a diagram explaining a relationship between a transition coefficient and change in an application ratio along a time axis.

Transition Coefficients $\alpha_{A1}$, $\alpha_{A2}$, $\alpha_{B1}$, $\alpha_{B2}$ The operator $53_{A1}$ in FIG. 18 is an image by which the user specifies the form of the change in the application ratio $R_A$ in the leading edge period $T_{A1}$ within the expression applied period $T_A$. The information manager 26 sets the transition coefficient $\alpha_{A1}$ to be a value variable within a range of between zero and one hundred, inclusive, according to the operation performed by the user on the operator $53_{A1}$. As in the example shown in FIG. 20, the form of the temporal change in the application ratio $R_A$ within the leading edge period $T_{A1}$ is controlled according to the transition coefficient $\alpha_{A1}$. In a case where the transition coefficient $\alpha_{A1}$ is set to an initial value (e.g., 50), the application ratio $R_A$ increases linearly over the leading edge period $T_{A1}$.

When an upward operation is performed on the operator $53_{A1}$ (e.g., mouse-dragging the operator $53_{A1}$ upward), the information manager 26 increases the value of the transition coefficient $\alpha_{A1}$ by an amount corresponding to the amount of operation from the initial value. As in the example shown in FIG. 20, when the transition coefficient $\alpha_{A1}$ is above the initial value of 50, the application ratio $R_A$ increases from zero to the maximum value $R_{Amax}$ along an upward convex locus $r_{A1}$ over time within the leading edge period $T_{A1}$. When a downward operation is performed on the operator $53_{A1}$, the information manager 26 decreases the value of the transition coefficient $\alpha_{A1}$ by an amount corresponding to the amount of operation. As in the example shown in FIG. 20, when the transition coefficient $\alpha_{A1}$ is below the initial value of 50, the application ratio $R_A$ increases from zero to the maximum value $R_{Amax}$ along a downward convex locus $r_{A1}$ over time within the leading edge period $T_{A1}$.

Figure 21:
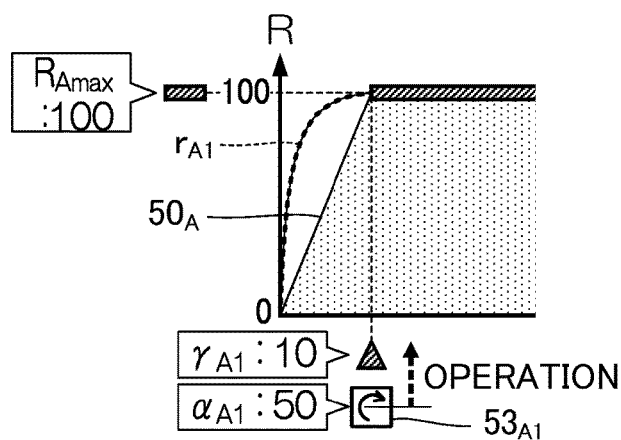
FIG. 21 is a diagram explaining an operation to change a transition coefficient.

As in the example shown in FIG. 21, while the operator $53_{A1}$ is being operated, the form of the transition image $50_A$ is maintained, and an interim locus $r_{A1}$ of the application ratio $R_A$ in the leading edge period $T_{A1}$ is shown in a form different from that of the transition image $50_A$. When an upward or downward operation is performed on the operator $53_{A1}$ as described above, the operator $53_{A1}$ itself does not move but the image of the arc-like pointer applied to the operator $53_{A1}$ changes. More specifically, the greater the value of the transition coefficient $\alpha_{A1}$ specified by the operation performed on the operator $53_{A1}$, the more extended is the pointer on the operator $53_{A1}$ in a circumferential direction. Accordingly, the user can perform an operation on the operator $53_{A1}$ as if he/she is performing an operation on an operation tab.

The method to change the form of the temporal change of the application ratio $R_A$ (locus $r_{A1}$) according to the transition coefficient $\alpha_{A1}$ may be freely selected. One possible method is to control the locus $r_{A1}$ of the application ratio $R_A$ within the leading edge period $T_{A1}$ according to the transition coefficient $\alpha_{A1}$ by using the following equation (1) that includes a variable $\lambda$ that depends on the transition coefficient $\alpha_{A1}$. The variable $\lambda$ in the equation (1) is a value obtained by converting the value of the transition coefficient $\alpha_{A1}$, which is within a range of $0 \leq \alpha_{A1} \leq 100$, to a value within a range of from −0.9 to +0.9. The symbol t in the equation (1) denotes a time elapsed from a start of the leading edge period $T_{A1}$ treated as an origin (t=0).

$$r_{A1} = \frac{1}{\pi} \times \tan^{-1} \frac{(1-\lambda^2)\sin \pi t}{(1+\lambda^2)\cos \pi t - 2\lambda} \quad (1)$$

In the foregoing, description is given of the temporal change of the application ratio $R_A$ in the leading edge period $T_{A1}$ of the expression applied period $T_A$ (i.e., the transition coefficient $\alpha_{A1}$). The temporal change of the application ratio $R_A$ in the trailing edge period $T_{A2}$ of the expression applied period $T_A$ (i.e., the transition coefficient $\alpha_{A2}$) similarly is set according to the operation performed on the operator $53_{A2}$. More specifically, the information manager 26 sets the transition coefficient $\alpha_{A2}$ according to the amount of operation performed by the user on the operator $53_{A2}$. In a case where the transition coefficient $\alpha_{A2}$ is set to an initial value (e.g., 50), the application ratio $R_A$ decreases linearly over the trailing edge period $T_{A2}$. When the transition coefficient $\alpha_{A2}$ is above the initial value 50, the application ratio $R_A$ decreases from the maximum value $R_{Amax}$ to zero along an upward convex locus $r_{A2}$ over the trailing edge period $T_{A2}$. When the transition coefficient $\alpha_{A2}$ is below the initial value 50, the application ratio $R_A$ decreases from the maximum value $R_{Amax}$ to zero along a downward convex locus $r_{A2}$ over the trailing edge period $T_{A2}$. The change in the pointer applied to the operator $53_{A2}$ and the display of the interim locus $r_{A2}$ while the operator $53_{A2}$ is being operated may be similar to those described with respect to the operations performed on the operator $53_{A1}$.

The locus $r_{A2}$ for the decrease of the application ratio $R_A$ in the trailing edge period $T_{A2}$ is expressed by the following equation (2). A variable $\lambda$ in the equation (2) is, similarly to that in the equation (1), a value obtained by converting the transition coefficient $\alpha_{A2}$ that is in the range of $0 \leq \alpha_{A2} \leq 100$ to a value in the range between −0.9 and +0.9. The symbol t in the equation (2) denotes the time elapsed from the start of the trailing edge period $T_{A2}$ treated as an origin (t=0).

$$r_{A2} = \frac{1}{\pi} \times \tan^{-1} \frac{(1-\lambda^2)\sin \pi t}{(1+\lambda^2)\cos \pi t - 2\lambda} + 1 \quad (2)$$

Similarly to the example described above, the transition coefficient $\alpha_{B1}$ that defines the form (locus $r_{B1}$) of the increase of the application ratio $R_B$ in the leading edge period $T_{B1}$ of the expression applied period $T_B$ is set in accordance with the operation performed by the user on the operator $53_{B1}$ shown in FIG. 18, and the transition coefficient $\alpha_{B2}$ that defines the form (locus $r_{B2}$) of the decrease of the application ratio $R_B$ in the trailing edge period $T_{B2}$ is set in accordance with the operation performed by the user on the operator $53_{B2}$ shown in FIG. 18. More specifically, when the transition coefficient $\alpha_{B1}$ or the transition coefficient $\alpha_{B2}$ is above an initial value (e.g., 50), the application ratio $R_B$ changes along an upward convex locus r ($r_{B1}$ or $r_{B2}$), and when the transition coefficient $\alpha_{B1}$ or the transition coefficient $\alpha_{B2}$ is below the initial value, the application ratio $R_B$ changes along a downward convex locus r ($r_{B1}$ or $r_{B2}$). The pointers applied to the operator $53_{B1}$ and the operator $53_{B2}$ change, and the interim loci r ($r_{B1}$ and $r_{B2}$) while the operator $53_{B1}$ and the operator $53_{B2}$ are being operated appear, in a manner similar to those described in the above example.

As described in the above example, in the second embodiment, the information manager 26 sets each variable in the control information Z in accordance with an operation received from the user. Such control information Z includes the following:

the duration ratios ($\tau_A$ and $\tau_B$) of the periods to which singing expressions are to be applied within the utterance period X2 of the target note;

the speed variables ($S_A$ and $S_B$) indicating, when the time length of a sound unit Q having the corresponding singing expression is to be extended and/or contracted, the degree of the extension or contraction, the speed variables also indicating which of the start side or end side of the sound unit Q is to be extended or contracted;

the maximum values of the application ratios R ($R_{Amax}$ and $R_{Bmax}$);

the temporal changes of the application ratios R on the start side of the singing expressions ($\gamma_{A1}$, $\gamma_{B1}$, $\alpha_A$, and $\alpha_{B1}$); and the temporal changes of the application ratios R on the end side of the singing expressions ($\gamma_{A2}$, $\gamma_{B2}$, $\alpha_{A2}$, and $\alpha_{B2}$).

Accordingly, in comparison with a configuration in which fixed values are set for the different variables included in the control information Z, it is possible to generate a voice signal V with various characteristics that match the preference or intention of the user. One or more of the multiple variables given as examples in the above description may be omitted, as appropriate. In other words, the information manager 26 can be understood as an element that sets at least one of the multiple variables given above as examples.

Third Embodiment

In the first embodiment, an example configuration is shown in which a sound unit P and a sound unit Q are each expressed as a sound waveform in the time domain or a spectrum in the frequency domain. In the third embodiment, each of a sound unit P and a sound unit Q is expressed with a plurality of feature amounts σ that approximately express the audio characteristics of the sound unit. In the third embodiment, parameters representative of the audio characteristics of different frames of a sound unit, such as a spectrum curve, excitation source characteristics, or a fundamental frequency, are used as examples of the feature amounts σ. A frame is a time length that serves as a unit of analysis of a sound unit. The voice synthesizer 28 calculates each feature amount σ as the weighted sum of the feature amount σ for the sound unit P and the feature amount σ for the sound unit Q of the singing expression, using the corresponding application ratio R as the weighted value. The voice synthesizer 28 inter-connects, along the time axis, sound units having frequency characteristics approximated by the calculated feature amounts σ to generate a voice signal V.

Figure 22:
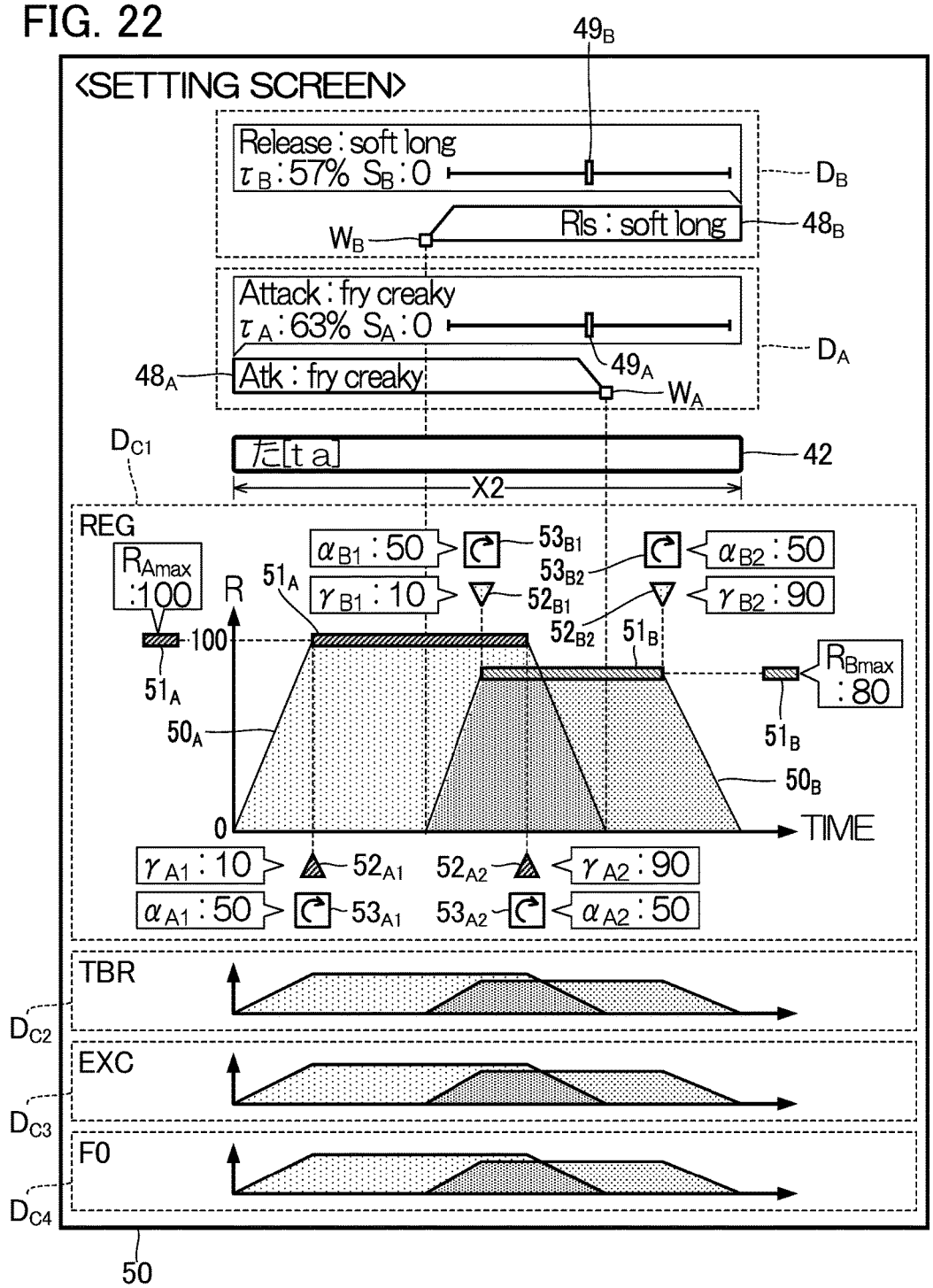
FIG. 22 is a diagram explaining a control information setting screen according to a third embodiment.

FIG. 22 is a display example of the control information setting screen 50 according to the third embodiment. As in the example shown in FIG. 22, the display controller 24 according to the third embodiment causes a region $D_C$ specifying the control information Z to be displayed separately for each feature amount σ (in $D_{C1}$ to $D_{C4}$). The feature amount σ (REG) shown in the region $D_{C1}$ indicates an excitation curve that approximates the spectrum curve of the vibration of the vocal cords. The feature amount σ (TBR) shown in the region $D_{C2}$ indicates a chest resonance that defines a predetermined number of band pass filters that approximates chest resonance characteristics. The feature amount σ (EXC) shown in the region $D_{C3}$ indicates a periodical excitation of the glottides. The feature amount σ (F0) shown in the region $D_{C4}$ indicates a fundamental frequency (pitch).

By appropriately operating the input device 16, the user can select a feature amount σ, from among the feature amounts σ, the control information Z of which is to be modified (hereinafter, a "target feature amount"). With respect to the target feature amount σ selected by the user, as in the example shown in the second embodiment, the display controller 24 in the third embodiment displays the transition image $50_A$, the transition image $50_B$, and the operators ($51_A$, $51_B$, $52_{A1}$, $52_{A2}$, $52_{B1}$, $52_{B2}$, $53_{A1}$, $53_{A2}$, $53_{B1}$, and $53_{B2}$) as shown in the region $D_{C1}$ in FIG. 22. With respect to each of the unselected feature amounts σ other than the target feature amount σ, the display controller 24 displays a simplified region $D_C$, as shown in the regions $D_{C2}$ to $D_{C4}$ in FIG. 22. More specifically, in a region $D_C$ for each unselected feature amount σ, the transition image $50_A$ and the transition image $50_B$ are vertically reduced in size, and the operators ($51_A$, $51_B$, $52_{A1}$, $52_{A2}$, $52_{B1}$, $52_{B2}$, $53_{A1}$, $53_{A2}$, $53_{B1}$, and $53_{B2}$) are hidden. In a manner similar to that in the second embodiment, the information manager 26 sets the control information Z defining the temporal change of the application ratio R of the target feature amount σ according to the operation performed by the user on the region $D_C$ of the target feature amount σ. It is not permitted to set the control information Z for each unselected feature amount σ.

In the third embodiment, for each of the feature amounts σ that relate to a singing expression, each variable in the corresponding control information Z is set in accordance with instructions from the user. Thus, it is possible to synthesize a variety of voices that reflect the user's intention or preference. Another configuration is also preferable in which the user can select between an operation mode in which the user sets the control information Z separately for each feature amount σ, as in the above example, and an operation mode in which the user sets the control information Z collectively for the feature amounts σ.

Modifications

The above-described modes may be modified in a variety of ways. Specific modes of modification are described in the following. Two or more modes freely selected from the modes described above and the modes described below may be appropriately combined so long as they do not contradict one another.

(1) In the above-described modes, a sound unit Q uttered at a particular pitch is adjusted to the pitch X1 specified by the synthesis information S. However, sound units Q that are obtained by uttering the same content (i.e., same text) at different pitches (e.g., at three pitches: a high pitch; a middle pitch; and a low pitch) may be recorded for each singing expression for inclusion in the sound unit group $L_2$; and a sound unit Q may be adjusted to the target pitch X1 by interpolating between sound units Q with different pitches.

(2) In the above-described modes, the operation icons ($46_A$ and $46_B$) are displayed when the indicator 44 moves into the range Y, which is between the start and the end of a note icon 42 along the time axis. However, a timing of when to display the operation icons ($46_A$ and $46_B$) is not limited to this example. For example, the operation icons ($46_A$ and $46_B$) may be displayed when the indicator 44 moves into a rectangular region where a predetermined range that covers the pitch X1 of the note icon 42 along the pitch axis overlaps the range Y of the note icon 42 along the time axis.

(3) In the third embodiment, an example configuration is described in which the sound unit P and the sound unit Q are each expressed with a plurality of feature amounts σ. In this case, the voice synthesizer 28 may extract a plurality of feature amounts σ from the sound unit P and the sound unit Q that are expressed each by, for example, a sound waveform or a frequency spectrum. In other words, the storage device 12 does not need to retain a plurality of feature amounts σ for each sound unit Q.

(4) In the above-described modes, examples are shown in which a singing expression is applied to each of the beginning section and the ending section of a note. However, sections to which singing expressions are applied are not limited to the beginning section and the ending section. For example, any of the above modes may be adopted when a singing expression is applied to a section in the middle of the utterance period X2 of a note. The total number of sections to each of which a singing expression is applied within the utterance period X2 of a note may be any number.

When the indicator 44 moves close to a note icon 42, an operation icon 46 (e.g., $46_A$, $46_B$, etc.) is displayed for each of all the sections to which singing expressions can be applied within the utterance period X2 of the note. A singing expression for a particular section within the utterance period X2 is selected using the displayed operation icon 46 corresponding to that section and is applied to that section. In this configuration, the user is able to visually recognize the sections to which singing expressions can be applied with respect to the note. Alternatively, an operation icon 46 may be displayed selectively for a particular section (e.g., the section that is closest to the indicator 44) from among the multiple sections, within the note, to which singing expressions can be applied. In the above-described modes, the operation icon $46_A$ and options C relating to a singing expression for the beginning section are arranged on the start side of the note icon 42, and the operation icon $46_B$ and options C relating to a singing expression for the ending section are arranged on the end side of the note icon 42. In view of a configuration in which there are sections other than the beginning section and the ending section, each configuration in the above-described modes may be comprehensively expressed as a configuration in which the operation icon 46 and options C relating to a singing expression for a particular section within a note are displayed in a position corresponding to this section, close to the note icon 42 of the note.

In a configuration in which a singing expression may be applied to a section other than the beginning section and the ending section, information that specifies this section (e.g., information that indicates the start and the end of the section, or information that indicates the range of the section) is set separately for each section in the note and is included in the expression information X4. In the sound unit group $L_2$, multiple sound units Q, each corresponding to a different singing expression, are registered for each section, within a note, to which a singing expression can be applied.

(5) In the above-described modes, the voice synthesis apparatus 100 including the voice synthesizer 28 is described as an example. However, the present invention may be exploited as an apparatus (an editing apparatus for voice synthesis) for editing a voice to be synthesized by the voice synthesizer 28. In other words, the voice synthesizer 28 is not an essential element in the editing apparatus for voice synthesis.

(6) The editing apparatus for voice synthesis, a preferable mode of which is the voice synthesis apparatus 100 shown above, is realized by a general arithmetic processing device, such as a CPU, and a program functioning in cooperation with each other, as shown in the above-mentioned embodiments. Alternatively, the editing apparatus may be realized by hardware (electric circuitry), such as a DSP, that is used exclusively for editing a voice to be synthesized. The above-mentioned program may be provided in a format stored in a computer-readable recording medium and be installed in a computer. The recording medium is, for example, a non-transitory recording medium and may preferably be an optical recording medium (e.g., an optical disc), such as a CD-ROM; but it may be a recording medium of any publicly-known format, such as a semiconductor recording medium or a magnetic recording medium. The program described above may be provided in a format distributed via a communication network and be installed in a computer. The present invention may also be understood as the operation method (editing method for voice synthesis) or the display control method for the editing apparatus in each of the above-described modes.

At least one of the following modes are understood from the above-mentioned embodiments and modifications.

A display control method according to the present invention is executed by a processor and includes the steps of: displaying, on a display device, a note icon that represents a note of a voice to be synthesized and an indicator that is moved in accordance with an operation received from a user; displaying, on the display device, first options that belong to a first layer among layers in a hierarchical structure, for the user to select a singing expression to be applied to the note from among a plurality of singing expressions; and displaying, on the display device, when the indicator is moved into an area corresponding to a particular option selected from among the first options, second options that correspond to the particular option and belong to a second layer that is below the first layer in the hierarchical structure. Since options are displayed in a layer-by-layer manner in the above configuration, a user can more easily find and select a desired singing expression compared with a configuration in which all types of singing expressions that are selectable by the user are shown all at once and the user selects a desired type of singing expression from them. In the above configuration, when the indicator is moved (e.g., mouseover) to an area that corresponds to a first option in a first layer in the hierarchical structure, second options belonging to a second layer below the first layer to which the subject first option belongs are displayed on the display device. Thus, in the above configuration, the user is able to select an option in a layer without being required to perform any operation other than to move an indicator (e.g., a mouse-click is not required). Therefore, compared with a configuration in which the user selects a desired option by performing an operation additional to the moving of the indicator, the difficulty placed on the user in selecting any one of singing expressions is reduced. Here, "an area that corresponds to an option" typically is an area that overlaps the subject option, but it may be an area close to the subject option.

The display control method according to a preferred mode of the present invention further includes the step of selecting a singing expression to be applied to the note from among the plurality of singing expressions, after options belonging to at least two layers including the first layer, which is the highest layer among the layers in the hierarchical structure, are selected by the user, wherein the selected singing expression is specified by a combination of the selected options.

The display control method according to a preferred mode of the present invention further includes the steps of: arranging, within a score region having a time axis, the note icon that extends along the time axis over an utterance period of the note; and displaying, on the display device, a first operation icon when the indicator is moved into a range of the utterance period. The first options are displayed on the display device when the indicator is moved to a position corresponding to the first operation icon. In this configuration, when the indicator moves into the range of the utterance period shown with a note icon along the time axis, an operation icon is displayed, and when the indicator moves to a position corresponding to the operation icon, options that belong to the highest layer of the hierarchical structure are displayed. Thus, compared with a configuration in which operation icons are constantly shown, the display image is simplified. Furthermore, because the options belonging to the highest layer are displayed (i.e., the selection of an option for each layer by the user is initiated) when the indicator moves to the position corresponding to the operation icon, a difficulty placed on the user during operation can be reduced as compared to a configuration in which the options belonging to the highest layer are displayed when an operation other than moving the indicator (e.g., the clicking on the operation icon) is applied to the operation icon.

The display control method according to a preferred mode of the present invention further includes the steps of: changing the first operation icon, after the singing expression is selected by the user, into a second operation icon that represents a time length during which the singing expression is applied to the note; and changing a display length of the second operation icon along the time axis in accordance with an operation received from the user. In this configuration, the first operation icon, which serves as a trigger for displaying options of the highest layer, is changed into the second operation icon, which represents the time length during which the selected singing expression is applied to the note. Accordingly, compared with a configuration in which a first operation icon and a second operation icon are displayed separately at positions far apart, the user can more easily select a desired singing expression and adjust the time length of the duration to which the selected singing expression is to be applied, without shifting his/her view far from the vicinity of the note icon.

The display control method according to a preferred mode of the present invention further includes the step of: displaying a character string that indicates the selected singing expression on the second operation icon. In this configuration, while changing a display length of the second operation icon, the user can review for which singing expression he/she is adjusting the time length of application.

Preferably, options that belong to the highest layer among the layers represent categories of singing expressions, and one of which options is selected to select one of the categories by the user. Preferably, options that belong to the second highest layer among the layers and correspond to the selected category represent features of singing expressions of the category, and one of which options is selected to select one of the features by the user.

Preferably, the display control method causes options of each layer in the hierarchical structure for selecting a singing expression for a particular section within the note to be displayed at a position corresponding to the subject section, close to the note icon. By this configuration, the user is able to both visually and intuitively understand the relationship between the section and a singing expression to be applied to the section, since the options for singing expressions for the particular section of the note are displayed in a position that is close to the note icon and corresponds to the subject section. More specifically, options of each layer for selecting a singing expression for a beginning section of the utterance period of the note are displayed on a start side of the note icon, and options of each layer for selecting a singing expression for an ending section of the utterance period of the note are displayed on an end side of the note icon. In this configuration, the options for singing expressions for the beginning section of the note (e.g., the attack part) are displayed on the start side of the note icon, and the options for singing expressions for the ending section of the note (e.g., the release part) are displayed on the end side of the note icon. Therefore, the user is able to visually and intuitively understand the relationship between a portion (the start or the end) and a singing expression to be applied to the portion.

Preferably, the utterance period of the note includes multiple sections to each of which a singing expression can be applied. An operation icon is displayed on the display device for each section of the multiple sections when the indicator is moved into the range of the utterance period, and a singing expression is selected using the displayed operation icon of one section among the sections and applied to the one section. In this configuration, when the indicator moves close to the note icon, an operation icon is displayed for each of all the sections, within the note, to which a singing expression can be applied. Therefore, the user can visually recognize with ease the multiple sections to which the user can apply singing expressions with respect to the subject note.

Preferably, the display control method further includes the step of displaying, on the display device, control information that relates to a process of applying a singing expression selected by the user to the voice of the note to be synthesized. Preferably, the display control method further includes the step of setting each variable in the control information in accordance with an instruction received from the user. In this configuration, because variables in the control information relating to the application of singing expressions are set in accordance with instructions from the user, a variety of voices that reflect a preference or intention of the user can be synthesized. The control information includes at least one of the following variables: a duration ratio of a period, within the utterance period of the note, to which the singing expression is to be applied; a speed variable indicating, in a case where a voice component of the singing expression is to be at least either extended or contracted in the direction of the time axis, a degree of extension or contraction, the speed variable also indicating which of a start side or an end side of the voice component is to be extended or contracted; a maximum value of an application ratio of the singing expression to be applied to the voice of the note to be synthesized; a temporal change of the application ratio from a value at a start of the singing expression to the maximum value; and a temporal change of the application ratio from the maximum value to a value at an end of the singing expression.

Preferably, each variable in the control information is set in accordance with an operation received from the user with respect to each of a plurality of feature amounts. In this configuration, because variables in the control information are set in accordance with instructions received from the user for each of the plurality of feature amounts relating to singing expressions, a variety of voices that reflect the intention and/or the preferences of the user can be synthesized.

Preferably, the voice of the note is synthesized by mixing of a first sound unit and a second sound unit, the second sound unit having a singing expression selected by the user from among the plurality of singing expressions. In this configuration, because multiple sound units are mixed to synthesize a voice, there will be less deterioration in the voice whereby a more natural-sounding voice can be synthesized as compared to a configuration in which a single sound unit is modified to synthesize a voice.

An editing apparatus for voice synthesis according to the present invention includes: a display device; an input device configured to receive operations from a user; and a processor configured: to control the display device to display a note icon that represents a note of a voice to be synthesized and an indicator that is moved in accordance with an operation received by the input device; to control the display device to display first options that belong to a first layer among layers in a hierarchical structure, and when the indicator is moved into an area corresponding to a particular option from among the first options, to control the display device to display second options that correspond to the particular option and belong to a second layer that is below the first layer in the hierarchical structure; and to select a singing expression to be applied to the note, from among a plurality of singing expressions, according to selection operations received from the user by the input device, wherein the selection operations are performed in a layer-by-layer manner for the layers in the hierarchical structure. In the above configuration, the user is allowed to select one of the singing expressions by selecting an option for each layer in a step-by-step manner. Therefore, the user can more easily find and select a desired singing expression as compared to a configuration in which all possible singing expressions selectable by the user are shown at once and the user has to select a desired singing expression from them.

The present invention is described herein with reference to the above embodiments, but the present invention is not limited to the above embodiments. The configurations and details of the present invention may be modified in a variety of ways that a skilled person in the art would understand as remaining within the scope of the present invention. This application claims priority from Japanese Patent Application No. 2015-164279, filed on Aug. 21, 2015, and the disclosures of which are hereby incorporated by reference in their entirety.

DESCRIPTION OF REFERENCE SIGNS

100 . . . voice synthesis apparatus, 10 . . . arithmetic processing device, 12 . . . storage device, 14 . . . display device, 16 . . . input device, 18 . . . sound output device, 22 . . . instruction receiver, 24 . . . display controller, 25 . . . selection handler, 26 . . . information manager, 28 . . . voice synthesizer, 40 . . . editing screen, 42 . . . note icon.

What is claimed is:

1. A display control method executed by a processor, the method comprising the steps of:
displaying, on a display device, a note icon that represents a note of a voice to be synthesized and an indicator that is moved in accordance with an operation received from a user;
displaying, on the display device, first options that belong to a first layer among layers in a hierarchical structure while not displaying other layers among layers in the hierarchical structure when the indicator is not moved into an area corresponding to an option of the first options, for the user to select a singing expression to be applied to the note from among a plurality of singing expressions; and
displaying, on the display device, when the indicator is moved into an area corresponding to a particular option selected from among the first options and without requiring any further operation, second options that correspond to the particular option and belong to a second layer that is below the first layer in the hierarchical structure, the second options being displayed in a balloon image, the balloon image being positioned on the display so as not to overlap with the previously displayed options.

2. The display control method according to claim 1, further comprising the step of selecting a singing expression to be applied to the note from among the plurality of singing expressions, after options belonging to at least two layers including the first layer, which is the highest layer among the layers in the hierarchical structure, are selected by the user, wherein the selected singing expression is specified by a combination of the selected options.

3. The display control method according to claim 2, wherein options that belong to the highest layer among the layers represent categories of singing expressions, and one of which options is selected to select one of the categories by the user.

4. The display control method according to claim 3, wherein options that belong to the second highest layer among the layers and correspond to the selected category represent features of singing expressions of the category, and one of which options is selected to select one of the features by the user.

5. The display control method according to claim 2, further comprising the steps of:
arranging, within a score region having a time axis, the note icon that extends along the time axis over an utterance period of the note; and
displaying, on the display device, a first operation icon when the indicator is moved into a range of the utterance period,
wherein the first options are displayed on the display device when the indicator is moved to a position corresponding to the first operation icon.

6. The display control method according to claim 5, wherein options of each layer for selecting a singing expression for a beginning section of the utterance period of the note are displayed on a start side of the note icon, and options of each layer for selecting a singing expression for an ending section of the utterance period of the note are displayed on an end side of the note icon.

7. The display control method according to claim 5, wherein the utterance period of the note includes multiple sections to each of which a singing expression can be applied,
wherein an operation icon is displayed on the display device for each section of the multiple sections when the indicator is moved into the range of the utterance period, and
wherein a singing expression is selected with using the displayed operation icon of one section among the sections and applied to the one section.

8. The display control method according to claim 5, further comprising the steps of:

changing the first operation icon, after the singing expression is selected by the user, into a second operation icon that represents a time length during which the singing expression is applied to the note; and changing a display length of the second operation icon along the time axis in accordance with an operation received from the user.

9. The display control method according to claim 8, further comprising the step of displaying a character string that indicates the selected singing expression on the second operation icon.

10. The display control method according to claim 1, further comprising the step of displaying, on the display device, control information that relates to a process of applying a singing expression selected by the user to the voice of the note to be synthesized, wherein the control information includes at least one of the following variables: a duration ratio of a period, within the utterance period of the note, to which the singing expression is to be applied; a speed variable indicating, in a case where a voice component of the singing expression is to be at least either extended or contracted in the direction of the time axis, a degree of extension or contraction, the speed variable also indicating which of a start side or an end side of the voice component is to be extended or contracted; a maximum value of an application ratio of the singing expression to be applied to the voice of the note to be synthesized; a temporal change of the application ratio from a value at a start of the singing expression to the maximum value; or a temporal change of the application ratio from the maximum value to a value at an end of the singing expression.

11. The display control method according to claim 10, further comprising the step of setting each variable in the control information in accordance with an operation received from the user.

12. The display control method according to claim 11, wherein each variable in the control information is set in accordance with an operation received from the user with respect to each of a plurality of feature amounts.

13. The display control method according to claim 1, wherein the voice of the note is synthesized by mixing of a first sound unit and a second sound unit, the second sound unit having a singing expression selected by the user from among the plurality of singing expressions.

14. The display control method according to claim 1, further comprising the steps of:

arranging, within a score region having a time axis, the note icon that extends along the time axis over an utterance period of the note; and displaying, on the display device, a first operation icon when the indicator is moved into a range of the utterance period, wherein the first options are displayed on the display device when the indicator is moved to a position corresponding to the first operation icon.

15. An editing apparatus for voice synthesis comprising:
a display device;
an input device configured to receive operations from a user; and
a processor configured to:
control the display device to display a note icon that represents a note of a voice to be synthesized and an indicator that is moved in accordance with an operation received by the input device;
control the display device to display first options that belong to a first layer among layers in a hierarchical structure while not displaying other layers among layers in the hierarchical structure when the indicator is not moved into an area corresponding to an option of the first options, and when the indicator is moved into an area corresponding to a particular option from among the first options and without requiring any further operation, to control the display device to display second options that correspond to the particular option and belong to a second layer that is below the first layer in the hierarchical structure, the second options being displayed in a balloon image, the balloon image being positioned on the display so as not to overlap with the previously displayed options; and
select a singing expression to be applied to the note, from among a plurality of singing expressions, according to selection operations received from the user by the input device, wherein the selection operations are performed in a layer-by-layer manner for the layers in the hierarchical structure.

16. The editing apparatus according to claim 15, wherein the processor is further configure to:
arrange, within a score region having a time axis, the note icon that extends along the time axis over an utterance period of the note; and
and control the display device to display a first operation icon when the indicator is moved into a range of the utterance period,
wherein the first options are displayed on the display device when the indicator is moved to a position corresponding to the first operation icon.

* * * * *